United States Patent
Sugiyama et al.

(10) Patent No.: US 9,400,347 B2
(45) Date of Patent: Jul. 26, 2016

(54) DISPLAY DEVICE

(71) Applicant: Panasonic Corporation, Osaka (JP)

(72) Inventors: Keiji Sugiyama, Kyoto (JP); Shinichi Shikii, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 405 days.

(21) Appl. No.: 13/978,277

(22) PCT Filed: Nov. 20, 2012

(86) PCT No.: PCT/JP2012/007445
§ 371 (c)(1),
(2) Date: Jul. 3, 2013

(87) PCT Pub. No.: WO2013/080488
PCT Pub. Date: Jun. 6, 2013

(65) Prior Publication Data
US 2013/0286678 A1      Oct. 31, 2013

Related U.S. Application Data

(60) Provisional application No. 61/563,919, filed on Nov. 28, 2011.

(51) Int. Cl.
*F21V 8/00*       (2006.01)
*H04N 13/04*      (2006.01)

(52) U.S. Cl.
CPC ............ *G02B 6/0011* (2013.01); *G02B 6/0076* (2013.01); *H04N 13/0402* (2013.01);
(Continued)

(58) Field of Classification Search
CPC .. G02B 6/0011; G02B 6/0013; G02B 6/0025; G02B 6/0028; G02B 6/0068; G02B 6/003; G02B 6/0031; G02B 6/0075; G02B 6/0076; G02B 6/0051; G02B 6/0055; G02B 6/0091; G02B 19/0028; G02B 19/0066; G02B 27/0961; G02B 6/0023; G02B 6/0048; G02B 6/0053; G02F 1/1323; G02F 1/133615; G02F 2001/133607
See application file for complete search history.

(56) References Cited

U.S. PATENT DOCUMENTS 6,496,236 B1 * 12/2002 Cole ................. G02F 1/133615
                                                345/102
7,750,982 B2     7/2010 Nelson et al.
(Continued)

FOREIGN PATENT DOCUMENTS

CN        101978306       2/2011
CN        102207576      10/2011
(Continued)

OTHER PUBLICATIONS

International Search Report issued Jan. 29, 2013 in International Application No. PCT/JP2012/007445.
(Continued)

*Primary Examiner* — Hargobind S Sawhney
(74) *Attorney, Agent, or Firm* — Wenderoth, Lind & Ponack, L.L.P.

(57) ABSTRACT

A display device includes: a first light source which emits light; a second light source which emits light; a display panel which displays an image; a first light guide plate and a second light guide plate which guide, to the display panel, the light from the first light source and the light from the second light source, respectively; and a control unit which causes one of the first light source and the second light source to emit the light. A first divergence angle obtained when the light from the first light source enters the first light guide plate is larger than a second divergence angle obtained when the light from the second light source enters the second light guide plate.

9 Claims, 12 Drawing Sheets

(52) U.S. Cl.
CPC ....... *H04N13/0418* (2013.01); *H04N 13/0422* (2013.01); *H04N 13/0454* (2013.01); *H04N 13/0477* (2013.01); *H04N 13/0497* (2013.01); *G02B 6/0048* (2013.01)

(56) References Cited

U.S. PATENT DOCUMENTS

| | | | |
|---|---|---|---|
| 7,847,869 | B2 | 12/2010 | Nelson et al. |
| 8,339,444 | B2 | 12/2012 | Schultz et al. |
| 2006/0119795 | A1 | 6/2006 | Lippey et al. |
| 2007/0030240 | A1 | 2/2007 | Sumiyoshi et al. |
| 2007/0076434 | A1* | 4/2007 | Uehara ................ G02B 6/0053 362/616 |
| 2008/0112187 | A1* | 5/2008 | Katsumata ........... G02B 6/0068 362/611 |
| 2008/0246837 | A1 | 10/2008 | Schultz et al. |
| 2009/0067156 | A1* | 3/2009 | Bonnett ............... G02B 6/0076 362/97.2 |
| 2009/0237576 | A1 | 9/2009 | Nelson et al. |
| 2010/0232015 | A1 | 9/2010 | Nelson et al. |
| 2011/0242441 | A1 | 10/2011 | Minami |
| 2012/0127127 | A1* | 5/2012 | Large .................... G06F 3/0304 345/175 |
| 2014/0368907 | A1 | 12/2014 | Minami |

FOREIGN PATENT DOCUMENTS

| | | |
|---|---|---|
| CN | 102207632 | 10/2011 |
| JP | 2006-292914 | 10/2006 |
| JP | 2007-47229 | 2/2007 |
| JP | 2008-164931 | 7/2008 |
| JP | 2009-217142 | 9/2009 |
| JP | 2010-524047 | 7/2010 |
| JP | 2010-277901 | 12/2010 |
| WO | 2008/124709 | 10/2008 |

OTHER PUBLICATIONS

Office Action and Search Report issued Oct. 10, 2015 in corresponding Chinese Application No. 20120004541.0, with partial English translation.

* cited by examiner

DISPLAY DEVICE

This application claims the benefit of U.S. Provisional Application No. 61/563,919, filed Nov. 28, 2011.

TECHNICAL FIELD

The present invention relates to a display device which has a switchable viewing angle for displaying an image.

BACKGROUND ART

A liquid crystal display device is one example of a display device which displays an image. The liquid crystal display device includes a liquid crystal panel serving as a spatial modulation element and a planar lighting device (a backlight) emitting light toward the back of the liquid crystal panel. The light passing through the liquid crystal panel is spatially modulated and, as a result, an image is formed on the liquid crystal panel.

Examples of the liquid crystal display device include a two-dimensional (2D) display capable of displaying two dimensions and a three-dimensional (3D) display capable of displaying three dimensions.

Firstly, a configuration of a conventional 2D display is described. FIG. 11 is a diagram showing a configuration of a conventional liquid crystal display device 20 capable of 2D displaying. The liquid crystal display device 20 shown in the diagram includes a light source 201, a light guide plate 202, a diffuser plate 203, a liquid crystal panel 204, and a control unit 205. The control unit 205 controls the light source 201 and the liquid crystal panel 204.

Light emitted from the light source 201 enters a side surface 202a of the light guide plate 202. The light entering the side surface 202a of the light guide plate 202 is transmitted through the light guide plate 202. Then, the traveling direction of the light is changed by a prism unit 202c provided at the bottom surface of the light guide plate 202. After this, the light is emitted from a main surface 202b of the light guide plate 202. The light emitted from the main surface 202b of the light guide plate 202 is diffused by the diffuser plate 203, and then illuminates the liquid crystal panel 204. Here, the light diffused by the light by the diffuser plate 203 allows the display luminance to be uniform on the liquid crystal panel 204. By illuminating the liquid crystal panel 204 with the light emitted from the light source 201 in this way, the liquid crystal display device 20 can provide 2D displaying to a user 60.

A method of configuring the aforementioned diffuser plate 203 with a liquid crystal element has been proposed (see Patent Literature 1, for example). In this case, the control unit 205 controls a voltage to be applied to the liquid crystal element of the diffuser plate 203. With this, the diffuser plate 203 is switchable between a diffusion state where the incident light is diffused and a non-diffusion state where the incident light is allowed to pass through without being diffused. With this switching of the diffuser plate 203 between the diffusion state and the non-diffusion state, a viewing angle of 2D displaying can be changed. For example, when one user 60 is watching the liquid crystal panel 204, the viewing angle of 2D displaying can be reduced by switching the diffuser plate 203 to the non-diffusion state. Thus, power consumption of the light source 201 required to implement a predetermined display luminance can be reduced. Moreover, since the light from the liquid crystal panel 204 is not spread out, the privacy of displayed data can be protected. On the other hand, when two or more users 60 are watching the liquid crystal panel 204, for example, the viewing angle of 2D displaying can be increased by switching the diffuser plate 203 to the diffusion state.

Next, a configuration of a conventional 3D display is described. FIG. 12 is a diagram showing a configuration of a conventional liquid crystal display device 30 capable of 3D displaying. The liquid crystal display device 30 shown in the diagram includes a pair of light sources 301 and 302, a light guide plate 303, a liquid crystal panel 304, and a control unit 305 (see Patent Literature 2, for example). The light source 301 and the light source 302 of the pair are positioned opposite, respectively, to a side surface 303a and a side surface 303b of the light guide plate 303. A prism unit 303c is provided on the bottom surface of the light guide plate 303. The shape of the prism unit 303c is designed in such a manner that light from the light source 301 is focused on a right eye 61a of the user 60 and that light from the light source 302 is focused on a left eye 61b of the user 60.

The control unit 305 causes the light source 301 and the light source 302 of the pair to illuminate alternately. Here, suppose that the light source 301 illuminates. In this case, as shown by a solid arrow 306 in FIG. 12, after the light emitted from the light source 301 is reflected by the prism unit 303c of the light guide plate 303, the light is emitted from a main surface 303d of the light guide plate 303 and is then focused on the right eye 61a of the user 60. Next, suppose that the light source 302 illuminates. In this case, as shown by a dashed arrow 307 in FIG. 2, after the light emitted from the light source 302 is reflected by the prism unit 303c of the light guide plate 303, the light is emitted from the main surface 303d of the light guide plate 303 and is then focused on the left eye 61b of the user 60. While the light source 301 is illuminating, the control unit 305 causes the liquid crystal panel 304 to display a parallax image for the right eye. While the light source 302 is illuminating, the control unit 305 causes the liquid crystal panel 304 to display a parallax image for the left eye. With the parallax caused by the different images shown to the right eye 61a and the left eye 61b of the user 60, the liquid crystal display device 30 can provide 3D displaying to the user 60.

When an image is displayed at a narrow viewing angle as in the case of the aforementioned 3D display, the light sources 301 and 302 having small divergence angles are used. In general, each of the light beams emitted from the light sources 301 and 302 has a property of diverging to a certain extent. Here, the divergence angle refers to an angle of divergence measured when the light emitted from the corresponding one of the light sources 301 and 302 enters the corresponding one of the side surfaces 303a and 303b of the light guide plate 303. Each of the light sources 301 and 302 having the small divergence angles can be configured with, for example, a light emitting diode (LED) light source and a collimator lens that is positioned between the LED light source and the light guide plate 303. By using these light sources 301 and 302 having the small divergence angles, divergence of the light to be emitted from the liquid crystal panel 304 can be reduced. This can prevent crosstalk from occurring. Here, crosstalk is a phenomenon in which a parallax image that should enter one of the eyes of the user 60 undesirably enters the other eye as well.

It should be noted that, by setting the same parallax image for the right eye and the left eye, the aforementioned liquid crystal display device 30 can function as a privacy display. The privacy display is used for preventing an image displayed on the liquid crystal panel 304 from being peeked by a third person other than the user 60.

CITATION LIST

Patent Literature

[PTL 1]
Japanese Unexamined Patent Application Publication No. 2007-47229
[PLT2]
Japanese Unexamined Patent Application Publication No. 2010-524047

SUMMARY OF INVENTION

Technical Problem

In recent years, a liquid crystal display device that is switchable between 2D displaying and 3D displaying (i.e., switchable between a wide viewing angle and a narrow viewing angle) has been proposed. Here, when the normal to a liquid crystal panel is 0° angle, the viewing angle is an inclination angle of the line of sight at which the user can practically view the image displayed on the liquid crystal panel. In such a liquid crystal display device, a light source having a small divergence angle is used in order to prevent crosstalk from occurring when 3D displaying is executed at a narrow viewing angle.

However, when the light source having a small divergence angle is used, the divergence of the light to be emitted from the liquid crystal panel is reduced. Therefore, the viewing angle at which 2D displaying is to be executed cannot be increased much. For this reason, output of the LED light source needs to be increased in order to execute 2D displaying at a wide viewing angle. In this case, however, power consumption of the LED light source increases.

In view of this, the present invention provides a display device which has a switchable viewing angle for displaying an image and can reduce power consumption required when an image is to be displayed at a wide viewing angle.

Solution to Problem

The display device in an aspect according to the present invention is a display device which has a switchable viewing angle for displaying an image and includes: a first light source which emits light; a second light source which emits light; a display panel which displays the image; a light guide plate which guides each of the light from the first light source and the light from the second light source to the display panel; and a control unit which causes one of the first light source and the second light source to emit the light, wherein a first divergence angle obtained when the light from the first light source enters the light guide plate is larger than a second divergence angle obtained when the light from the second light source enters the light guide plate.

It should be noted that this general and specific aspect may be implemented using a system, a method, an integrated circuit, a computer program, or a computer-readable recording medium such as a CD-ROM. Alternatively, the aspect may be implemented by any combination of systems, methods, integrated circuits, computer programs, and recording media.

Advantageous Effects of Invention

In the display device according to the present invention, a first light source having a relatively large divergence angle is used when an image is to be displayed at a wide viewing angle, and a second light source having a relatively small divergence angle is used when an image is to be displayed at a narrow viewing angle. By using different light sources such as the first light source and the second light source, power consumption of the first light source used when the image is to be displayed at the wide viewing angle can be reduced.

DESCRIPTION OF EMBODIMENTS

[Underlying Knowledge Forming Basis of Present Invention]

The present inventors found that the liquid crystal display devices described in "Background Art" had the following problem.

Figure 13:
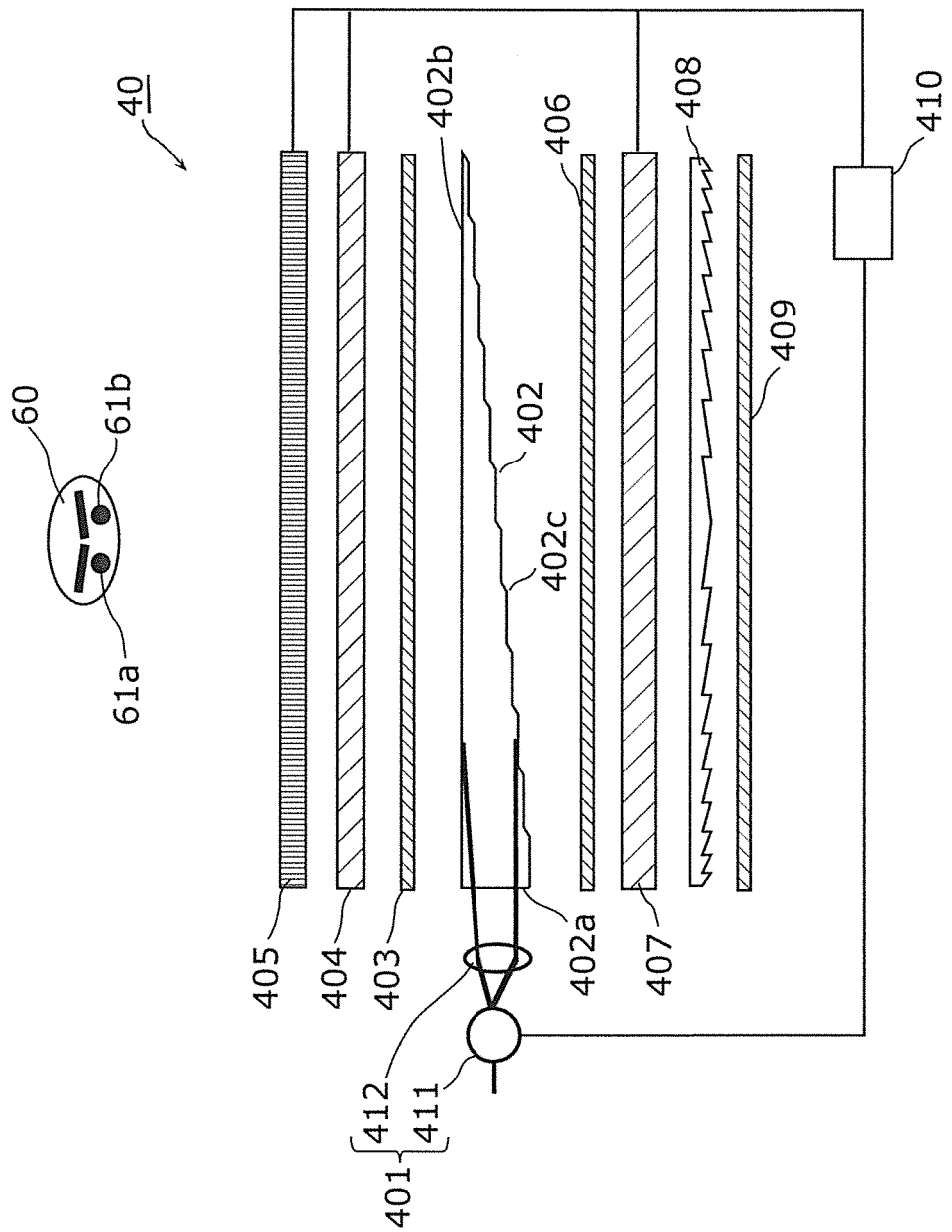
FIG. 13 is a diagram showing a configuration of a conventional liquid crystal display device that is switchable between 2D displaying and 3D displaying.

FIG. 13 is a diagram showing a configuration of a conventional liquid crystal display device 40 switchable between 2D displaying and 3D displaying. The liquid crystal display device 40 shown in the diagram includes a light source 401, a light guide plate 402, a polarized-light reflecting plate 403, a switchable diffusing element 404, a liquid crystal panel 405, a quarter wavelength plate 406, a light deflector 407, a Fresnel lens 408, a reflecting plate 409, and a control unit 410.

The light source 401 includes an LED light source 411 and a collimator lens 412 that is positioned between the LED light source 411 and the light guide plate 402. The LED light source 411 is configured to be able to switch the polarization direction of light to be emitted. To be more specific, the light to be emitted from the LED light source 411 is switchable between: S-polarized light that is linearly polarized light polarized in the direction perpendicular to the plane where the present diagram is illustrated; and P-polarized light that is linearly polarized light polarized in the direction parallel to the plane where the present diagram is illustrated. The collimator lens 412 reduces the divergence angle of the light that is emitted from the LED light source 411 and enters a side surface 402a of the light guide plate 402.

The polarized-light reflecting plate 403 is positioned between the light guide plate 402 and the liquid crystal panel 405. The polarized-light reflecting plate 403 has a property of allowing the S-polarized light to pass through and reflecting the P-polarized light. The polarized-light reflecting plate 403 is configured with, for example, a wire grid.

The switchable diffusing element 404 is positioned between the polarized-light reflecting plate 403 and the liquid crystal panel 405. The switchable diffusing element 404 is switchable between a diffusion state where the incident light is diffused and a non-diffusion state where the incident light is allowed to pass through without being diffused. When the light emitted from the LED light source 411 is the S-polarized light, the switchable diffusing element 404 is switched to the diffusion state by the control unit 410. When the light emitted from the LED light source 411 is the P-polarized light, the switchable diffusing element 404 is switched to the non-diffusion state by the control unit 410.

The reflecting plate 409 is positioned on the opposite side of the liquid crystal panel 405 across the light guide plate 402. The reflecting plate 409 has a function of reflecting light in the specular direction.

The quarter wavelength plate 406 is positioned between the light guide plate 402 and the reflecting plate 409. The quarter wavelength plate 406 is a retardation film having a function of transforming linearly-polarized light having a certain wavelength into circular polarized light (or transforming circular polarized light into linearly polarized light). A quarter phase difference (i.e., a phase difference of 90° angle) of a wavelength λ occurs between the linearly polarized light incident on the quarter wavelength plate 406 and the linearly polarized light emitted after passing through the quarter wavelength plate 406 twice.

The light deflector 407 is positioned between the quarter wavelength plate 406 and the reflecting plate 409. The light deflector 407 deflects the incident light in such a manner that the light alternately enters a right eye 61a and a left eye 61b of a user 60 in synchronization with a corresponding parallax image displayed on the liquid crystal panel 405.

The Fresnel lens 408 is positioned between the light deflector 407 and the reflecting plate 409. The Fresnel lens 408 has a function of focusing the emitted light on a predetermined focus spot.

The control unit 410 controls the switchable diffusing element 404, the liquid crystal panel 405, and the light deflector 407 described above.

The liquid crystal display device 40 described above operates as follows. The light emitted from the LED light source 411 is captured by the collimator lens 412 where the divergence angle is reduced. This light having the reduced divergence angle enters the side surface 402a of the light guide plate 402. Then, after being reflected by a prism unit 402c of the light guide plate 402, the light is emitted from a main surface 402b of the light guide plate 402. The light emitted from the main surface 402b of the light guide plate 402 enters the polarized-light reflecting plate 403.

When the light emitted from the LED light source 411 is the S-polarized light, the light emitted from the main surface 402b of the light guide plate 402 passes through the polarized-light reflecting plate 403 and enters the switchable diffusing element 404. Here, the switchable diffusing element 404 has been switched to the diffusion state. Thus, the light from the polarized-light reflecting plate 403 is diffused by the switchable diffusing element 404, and then illuminates the liquid crystal panel 405. The liquid crystal panel 405 displays an image for 2D displaying. Therefore, in this case, the liquid crystal display device 40 functions as a 2D display and can provide the user with 2D displaying.

On the other hand, when the light emitted from the LED light source 411 is the P-polarized light, the light emitted from the main surface 402b of the light guide plate 402 is reflected by the polarized-light reflecting plate 403. The light reflected by the polarized-light reflecting plate 403 passes through the light guide plate 402, and next passes through the quarter wavelength plate 406. The light passing through the quarter wavelength plate 406 is deflected by the light deflector 407, and is then focused by the Fresnel lens 408. The light emitted from the Fresnel lens 408 is reflected by the reflecting plate 409 and focused by the Fresnel lens 408 again. The light emitted from the Fresnel lens 408 is deflected by the light deflector 407 again. After this, by passing through the quarter wavelength plate 406, the light is transformed from the P-polarized light into the S-polarized light. This S-polarized light passes through the light guide plate 402 and the polarized-light reflecting plate 403, and then enters the switchable diffusing element 404. Here, the switchable diffusing element 404 has been switched to the non-diffusion state. Thus, the light from the polarized-light reflecting plate 403 passes through the switchable diffusing element 404 without being diffused, and then illuminates the liquid crystal panel 405.

The control unit 410 controls the light deflector 407 in such a manner that the light from the liquid crystal panel 405 is focused alternately on the right eye 61a and the left eye 61b of the user 60. Moreover, the control unit 410 controls a parallax image to be displayed on the liquid crystal panel 405 for 3D displaying, in synchronization with the deflection direction of the light from the liquid crystal panel 405. To be more specific, when the light from the liquid crystal panel 405 is deflected toward the right eye 61a of the user 60, the control unit 410 causes the liquid crystal panel 405 to display the parallax image for the right eye. When the light from the liquid crystal panel 405 is deflected toward the left eye 61b of the user 60, the control unit 410 causes the liquid crystal panel 405 to display the parallax image for the left eye. Therefore, in this case, the liquid crystal display device 40 functions as a 3D display and can provide the user 60 with 3D displaying.

As described thus far, the liquid crystal display device 40 shown in FIG. 13 is switchable between 2D displaying and 3D displaying by switching the polarization direction of the light emitted from the LED light source 411.

In the liquid crystal display device 40 shown in FIG. 13, the light source 401 having the small divergence angle is used in order to prevent crosstalk from occurring when 3D displaying is executed. However, the percentage of the amount of light to be captured by the collimator lens 412 with respect to the amount of light emitted from the LED light source 411 is about 40%, for example. On account of this, the light use efficiency of the entire optical system of the liquid crystal display device 40 is reduced. When 2D displaying is executed at a wide viewing angle using such an optical system, output of the LED light source 411 needs to be increased in order to implement a predetermined display luminance on the liquid crystal panel 405. To do so, however, power consumption of the LED light source 411 increases.

In order to solve the aforementioned problem, the display device in an aspect according to the present invention is a display device which has a switchable viewing angle for displaying an image and includes: a first light source which emits light; a second light source which emits light; a display panel which displays the image; a light guide plate which guides each of the light from the first light source and the light from the second light source to the display panel; and a control unit which causes one of the first light source and the second light source to emit the light, wherein a first divergence angle obtained when the light from the first light source enters the light guide plate is larger than a second divergence angle obtained when the light from the second light source enters the light guide plate.

With this, the first light source having a relatively large divergence angle is used when the image is to be displayed at a wide viewing angle, and the second light source having a relatively small divergence angle is used when the image is to be displayed at a narrow viewing angle. By using different light sources such as the first light source and the second light source, power consumption of the first light source used when the image is to be displayed at the wide viewing angle can be reduced.

For example, the display device in an aspect according to the present invention may further include a switchable diffusing element which is switchable between a diffusion state where light from the light guide plate is diffused and a non-diffusion state where the light from the light guide plate is allowed to pass through the switchable diffusing element without being diffused, wherein the control unit: switches the switchable diffusing element to the diffusion state when the first light source emits the light; and switches the switchable diffusing element to the non-diffusion state when the second light source emits the light.

With this, by switching the switchable diffusing element to the diffusion state when the first light source emits the light, the display luminance is allowed to be uniform on the display panel displaying the image at the wide viewing angle.

For example, the display device in an aspect according to the present invention may further include a light deflector which is capable of deflecting the light from the light guide plate, wherein the control unit: causes the first light source to emit the light when an image for 2D displaying is to be displayed on the display panel; and causes the second light source to emit the light, and control the light deflector in such a manner that light from the display panel is focused alternately on a right eye and a left eye of a user, when a parallax image for 3D displaying is to be displayed on the display panel.

With this, since the second light source having the relatively small divergence angle is used when 3D displaying is executed, the divergence of the light to be emitted from the display panel is reduced. This can prevent crosstalk from occurring. Since the first light source having the relatively large divergence angle is used when 2D displaying is executed, divergence of the light to be emitted from the display panel is increased. Thus, power consumption of the first light source required to execute 2D displaying at the wide viewing angle can be reduced.

For example, the display device in an aspect according to the present invention may further include a detection unit which detects each of positions of the right eye and the left eye of the user, wherein, when the viewing angle obtained in a case where the first light source emits the light is a first viewing angle and the viewing angle obtained in a case where the second light source emits the light is a second viewing angle smaller than the first viewing angle, the control unit: causes the second light source to emit the light when each of the positions of the right eye and the left eye detected by the detection unit is in the second viewing angle; and causes the first light source to emit the light when at least one of the positions of the right eye and the left eye detected by the detection unit is outside the second viewing angle.

With this, the viewing angle for displaying the image can be switched between the first viewing angle and the second viewing angle, according to the positions of the eyes of the user.

For example, in the display device in an aspect according to the present invention, the first light source may be a white light source, and the second light source may include a red-green-blue (RGB) light source having a red light source, a green light source, and a blue light source.

With this, the first light source can be configured with the white light source, and the second light source can be configured with the RGB light source.

For example, in the display device in an aspect according to the present invention, the light deflector may have a wavelength dependence, and the control unit may: cause the second light source to sequentially emit red light, green light, and blue light; and control the light deflector in such a manner that the red light, the green light, and the blue light sequentially incident on the light deflector have a same deflection angle.

With this, when the light deflector has a wavelength dependence, color deviation can be prevented from occurring.

For example, in the display device in an aspect according to the present invention, the first light source may be a white light-emitting diode (LED) light source, and the second light source may include: an RGB LED light source having a red LED light source, a green LED light source, and a blue LED light source; and an optical element that is positioned on an optical path between the RGB LED light source and the light guide plate and reduces the second divergence angle.

With this, the first light source can be configured with the white LED light source, and the second light source can be configured with the RGB LED light source and the optical element.

For example, in the display device in an aspect according to the present invention, the first light source may be an LED light source, and the second light source may include: a laser light source; and an optical element that is positioned on an optical path between the laser light source and the light guide plate and reduces the second divergence angle.

With this, the first light source can be configured with the LED light source, and the second light source can be configured with the laser light source and the optical element.

For example, in the display device in an aspect according to the present invention, the light guide plate may include: a first light guide plate which guides the light emitted from the first light source to the display panel; and a second light guide plate which guides the light emitted from the second light source to the display panel, and the first divergence angle obtained when the light from the first light source enters the first light guide plate is larger than the second divergence angle obtained when the light from the second light source enters the second light guide plate.

With this, the light guide plate can be configured with the first light guide plate and the second light guide plate.

For example, the display device in an aspect according to the present invention may further include a reflecting plate which reflects the light from the second light guide plate, wherein each of the first light guide plate and the second light guide plate includes a prism unit which changes a traveling direction of light incident on the prism unit, the first light guide plate and the second light guide plate are arranged in such a manner that the prism units are opposite to each other, the light from the first light guide plate is emitted to the display panel, and the light from the second light guide plate is emitted in a direction opposite to the display panel and is reflected by the reflecting plate to enter the display panel.

With this, a space in which the first light guide plate and the second light guide plate are to be arranged can be reduced. This allows the liquid crystal display device to be thin.

For example, the display device in an aspect according to the present invention may further include a Fresnel lens which is positioned between the second light guide plate and the reflecting plate and limits the viewing angle to be obtained when the second light source emits the light.

With this, the Fresnel lens can limit the viewing angle of when the second light source emits light.

It should be noted that these general and specific aspects may be implemented using a system, a method, an integrated circuit, a computer program, or a computer-readable recording medium such as a CD-ROM. Alternatively, the aspects may be implemented by any combination of systems, methods, integrated circuits, computer programs, and recording media.

The following is a concrete description of a display device in an aspect according to the present invention, with reference to the drawings.

It should be noted that each of Embodiments described below shows a general or specific example. The numerical values, shapes, materials, structural elements, the arrangement and connection of the structural elements, steps, the processing order of the steps, and so forth described in Embodiments below are only examples, and are not intended to limit the present invention. Thus, among the structural elements in Embodiments below, structural elements not recited in any one of the independent claims indicating top concepts according to the present invention are described as arbitrary structural elements.

Embodiment 1

Configuration of Liquid Crystal Display Device

Figure 1:
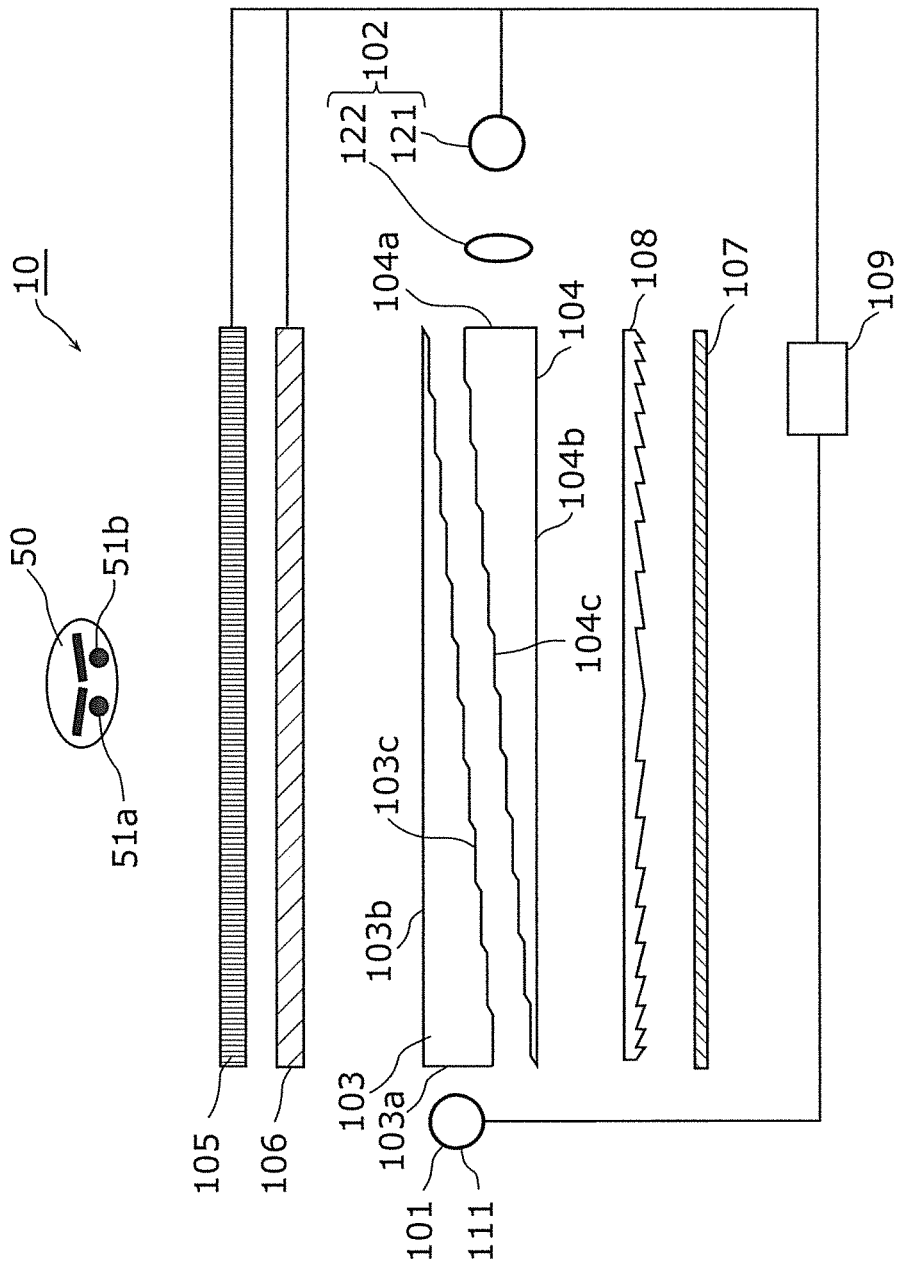
FIG. 1 is a diagram showing a configuration of a liquid crystal display device in Embodiment 1.

FIG. 1 is a diagram showing a configuration of a liquid crystal display device 10 in Embodiment 1. The liquid crystal display device 10 (configuring a display device) shown in FIG. 1 includes a first light source 101, a second light source 102, a first light guide plate 103 (configuring a light guide plate), a second light guide plate 104 (configuring the light guide plate), a liquid crystal panel 105 (configuring a display panel), a switchable diffusing element 106, a reflecting plate 107, a Fresnel lens 108, and a control unit 109.

The liquid crystal display device 10 in Embodiment 1 is a display device that is switchable between 2D displaying at a first viewing angle and 2D displaying (privacy displaying) at a second viewing angle smaller than the first viewing angle (that is, switchable between a 2D display and a privacy display). The liquid crystal display device 10 is, for example, a tablet device or a television set.

The first light source 101 is used when 2D displaying is executed at the first viewing angle that is a wide viewing angle. For example, the first light source 101 is a white LED light source 111 (configuring a white light source). The first light source 101 is positioned opposite to a side surface 103a of the first light guide plate 103. Light emitted from the first light source 101 enters the side surface 103a of the first light guide plate 103.

The second light source 102 is used when 2D displaying is executed at the second viewing angle that is a narrow viewing angle. For example, the second light source 102 includes a red-green-blue (RGB) LED light source 121 (configuring an RGB light source) and a collimator lens 122 (configuring an optical element). The RGB LED light source 121 includes a red LED light source, a green LED light source, and a blue LED light source. The RGB LED light source 121 is positioned opposite to a side surface 104a of the second light guide plate 104. The collimator lens 122 is positioned on an optical path between the RGB LED light source 121 and the second light guide plate 104. The collimator lens 122 has a function of reducing a divergence angle (described later) of light emitted from the RGB LED light source 121. The light emitted from the RGB LED light source 121 is captured by the collimator lens 122 where the divergence angle of the light is reduced. After this, the light enters the side surface 104a of the second light guide plate 104.

In Embodiment 1, a first divergence angle $\theta 1$ of the light emitted from the first light source 101 is larger than a second divergence angle $\theta 2$ of the light emitted from the second light source 102. The first divergence angle $\theta 1$ and the second divergence angle indicate values quantitatively representing the respective divergences of the light beams emitted from the first light source 101 and the second light source 102.

Figure 2A:
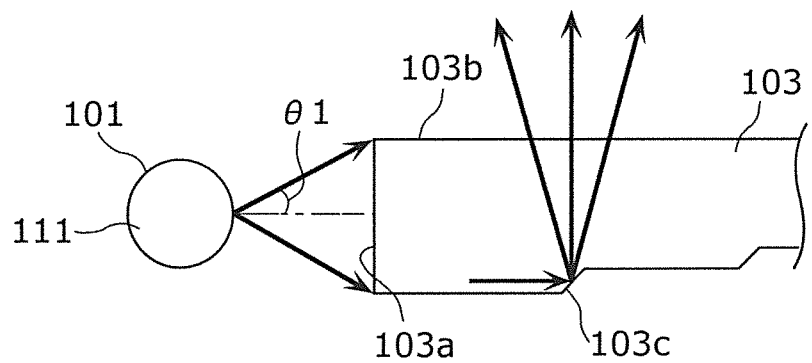
FIG. 2A is a schematic diagram showing a first divergence angle of light emitted from a first light source.

FIG. 2A is a schematic diagram showing the first divergence angle $\theta 1$ of the light emitted from the first light source 101. As shown in FIG. 2A, the light emitted from the white LED light source 111 gradually diverges to a certain extent and enters the side surface 103a of the first light guide plate 103. The first divergence angle $\theta 1$ refers to a half of the angle to which the light emitted from the white LED light source 111 diverges.

Figure 2B:
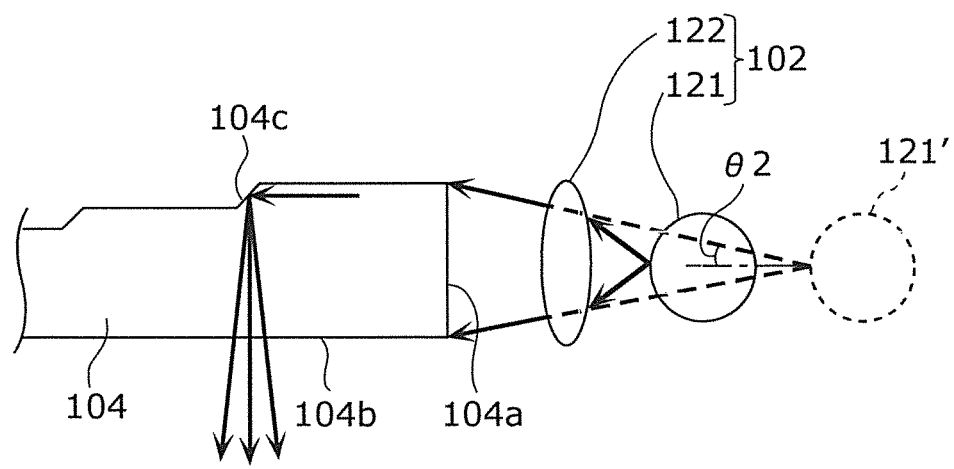
FIG. 2B is a schematic diagram showing a second divergence angle of light emitted from a second light source.

FIG. 2B is a schematic diagram showing the second divergence angle $\theta 2$ of the light emitted from the second light source 102. As shown in FIG. 2B, the light emitted from the RGB LED light source 121 gradually diverges to a certain extent and is captured by the collimator lens 122. Then, the divergence angle of the light is reduced by the collimator lens 122. The light emitted from the collimator lens 122 enters the side surface 104a of the second light guide plate 104. Suppose that a virtual light source 121' is arranged that emits light having a divergence of the light emitted from the collimator lens 122. Here, the second divergence angle $\theta 2$ refers to a half of the angle to which the light emitted from this virtual light source 121' diverges.

As shown in FIG. 2A and FIG. 2B, the divergence of the light emitted from the first light guide plate 103 is larger than the divergence of the light emitted from the second light guide plate 104. This is because, in general, divergence of light emitted from a light guide plate depends on the size of a divergence angle measured when the light enters the light guide plate (in other words, the angle of the light reflected by a prism unit of the light guide plate depends on the angle of the light incident on the light guide plate).

The first light guide plate 103 is used for 2D displaying executed at the first viewing angle that is a wide viewing angle. On one surface of the first light guide plate 103, a main surface 103b extending nearly perpendicular to the side surface 103a of the first light guide plate 103 is provided. On the other surface of the first light guide plate 103, a prism unit 103c used for changing the traveling direction of the light incident on the side surface 103a is formed. The prism unit 103c extends, sloping with respect to the main surface 103b. Accordingly, the cross-sectional shape of the first light guide plate 103 is nearly a right triangle.

The second light guide plate 104 is used for 2D displaying executed at the second viewing angle that is a narrow viewing angle. On one surface of the second light guide plate 104, a main surface 104b extending nearly perpendicular to the side surface 104a of the second light guide plate 104 is provided. On the other surface of the second light guide plate 104, a prism unit 104c used for changing the traveling direction of the light incident on the side surface 104a is formed. The prism unit 104c extends, sloping with respect to the main surface 104b. Accordingly, the cross-sectional shape of the second light guide plate 104 is nearly a right triangle.

In Embodiment 1, the first light guide plate 103 and the second light guide plate 104 are positioned in such a manner that the respective prism units 103c and 104c are opposite to each other. With this arrangement, the size of the liquid crystal display device 10 in the thickness direction (the vertical direction in FIG. 1) can be reduced. Moreover, the first light guide plate 103 and the second light guide plate 104 are positioned in such a manner that the respective side surfaces 103a and 104a face the opposite directions. Thus, the first light source 101 and the second light source 102 are positioned, respectively, at the right and left sides of the liquid crystal display device 10.

The liquid crystal panel 105 is positioned opposite to the main surface 103b of the first light guide plate 103. A plurality of pixels are arranged in a matrix in a display area of the liquid crystal panel 105. An image for 2D displaying is displayed in the display area of the liquid crystal panel 105.

The switchable diffusing element 106 is positioned between the first light guide plate 103 and the liquid crystal panel 105. The switchable diffusing element 106 is configured with a liquid crystal element, and is switchable between a diffusion state where the switchable diffusing element 106 becomes opalescent and the incident light is thus diffused and a non-diffusion state where the switchable diffusing element 106 becomes transparent and the incident light is thus allowed to pass through without being diffused. When a voltage is applied to the liquid crystal element, the switchable diffusing element 106 is switched to the diffusion state. When no voltage is applied to the liquid crystal element, the switchable diffusing element 106 is switched to the non-diffusion state.

The reflecting plate 107 is positioned opposite to the main surface 104b of the second light guide plate 104. The reflecting plate 107 has a function of reflecting light in the specular direction and is configured with, for example, a mirror.

The Fresnel lens 108 is positioned between the second light guide plate 104 and the reflecting plate 107. The Fresnel lens 108 has a function of focusing the emitted light on a predetermined focus spot.

The control unit 109 controls an image to be displayed on the liquid crystal panel 105. Moreover, by controlling the voltage to be applied to the liquid crystal element of the switchable diffusing element 106, the control unit 109 switches the switchable diffusing element 106 between the diffusion state and the non-diffusion state. Furthermore, when 2D displaying is to be executed at the first viewing angle, the control unit 109 causes the first light source 101 to emit light. When 2D displaying is to be executed at the second viewing angle, the control unit 109 causes the second light source 102 to emit light.

[Operation of Liquid Crystal Display Device]

Figure 3:
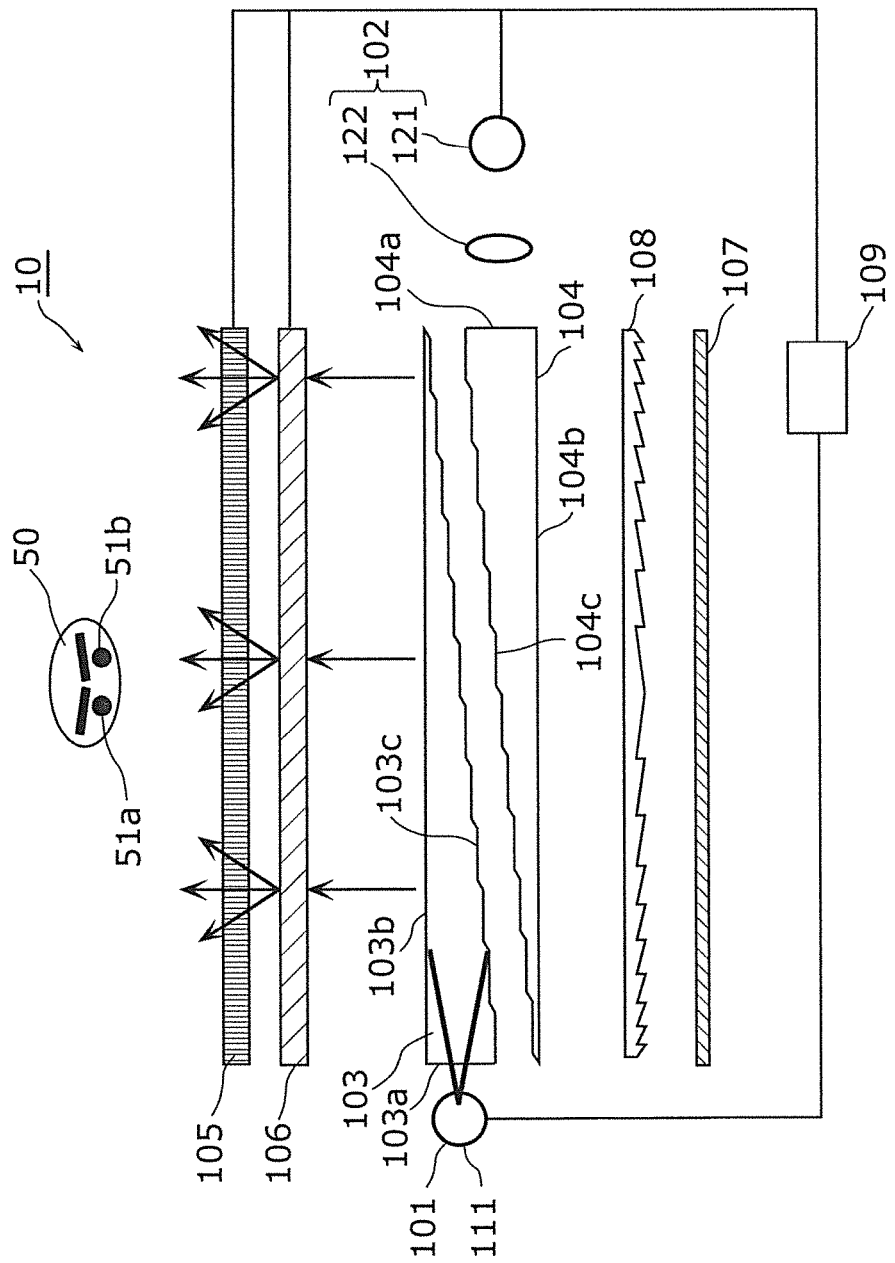
FIG. 3 is a diagram showing the liquid crystal display device in the case where 2D displaying is executed at a first viewing angle.
Figure 4:
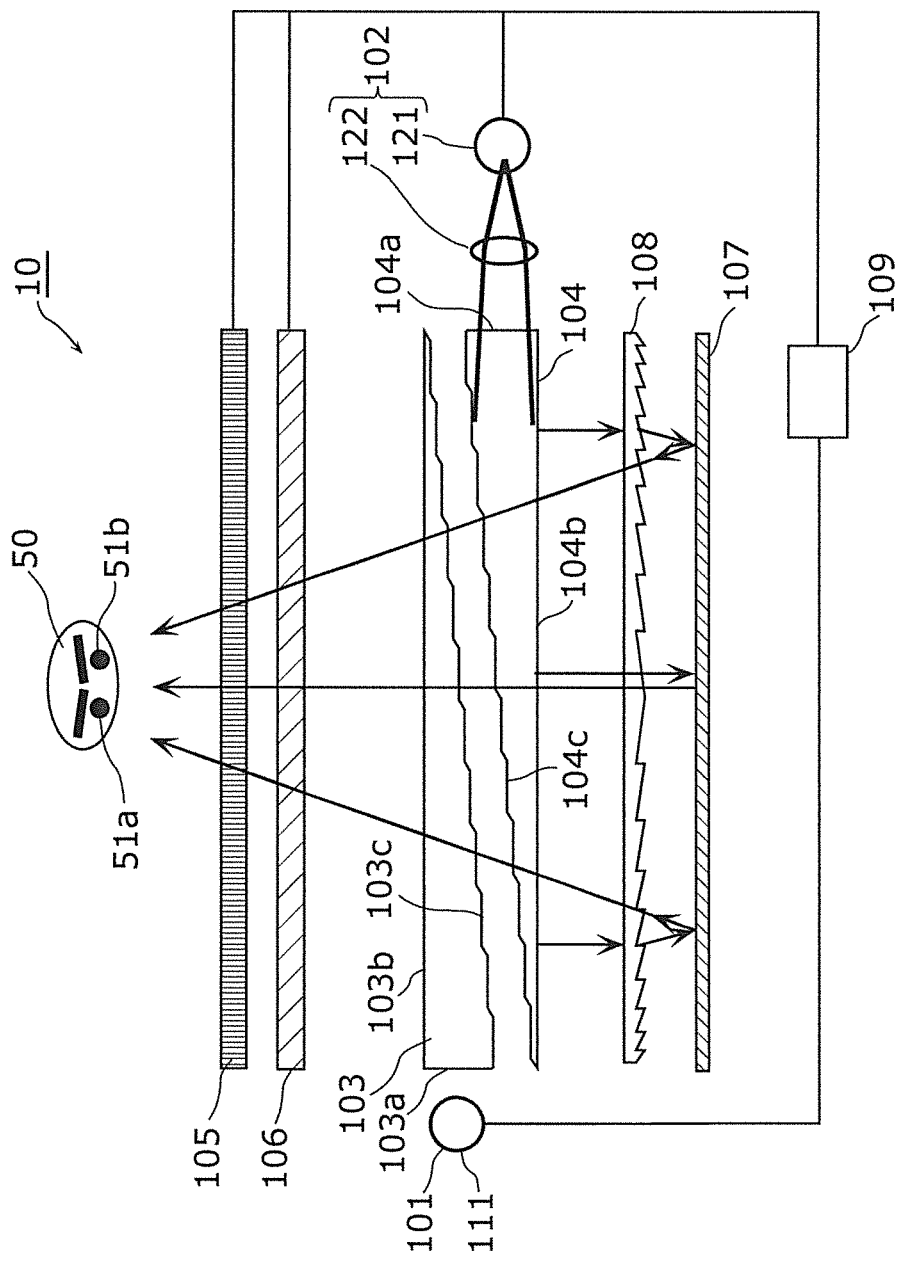
FIG. 4 is a diagram showing the liquid crystal display device in the case where 2D displaying is executed at a second viewing angle.

Next, an operation performed by the liquid crystal display device 10 in Embodiment 1 is described, with reference to FIG. 3 and FIG. 4. FIG. 3 is a diagram showing the liquid crystal display device 10 in the case where 2D displaying is executed at the first viewing angle. FIG. 4 is a diagram showing the liquid crystal display device 10 in the case where 2D displaying is executed at the second viewing angle.

Firstly, the following describes, with reference to FIG. 3, the case where the liquid crystal display device 10 functions as a 2D display to implement 2D displaying at the first viewing angle. In this case, the control unit 109 applies the voltage to the liquid crystal element of the switchable diffusing element 106. As a result, the switchable diffusing element 106 is switched to the diffusion state.

The light emitted from the first light source 101 enters the side surface 103a of the first light guide plate 103. The light entering the side surface 103a of the first light guide plate 103 is transmitted through the first light guide plate 103. Then, the traveling direction of the light is changed by the prism unit 103c. After this, the light is emitted from the main surface 103b toward the liquid crystal panel 105. The light emitted from the main surface 103b of the first light guide plate 103 is diffused by the switchable diffusing element 106, and then illuminates the liquid crystal panel 105.

In this way, the liquid crystal display device 10 can function as the 2D display and implement 2D displaying at the first viewing angle.

Next, the following describes, with reference to FIG. 4, the case where the liquid crystal display device 10 functions as a privacy display to implement 2D displaying at the second viewing angle. In this case, the control unit 109 applies no voltage to the liquid crystal element of the switchable diffusing element 106. As a result, the switchable diffusing element 106 is switched to the non-diffusion state.

The light emitted from the RGB LED light source 121 is reduced in divergence angle by the collimator lens 122 and, after this, enters the side surface 104a of the second light guide plate 104. The light entering the side surface 104a of the second light guide plate 104 is transmitted through the second light guide plate 104. Then, the traveling direction of the light is changed by the prism unit 104c. After this, the light is emitted from the main surface 104b to the direction opposite to the liquid crystal panel 105. The light emitted from the main surface 104b of the second light guide plate 104 enters the Fresnel lens 108. With the light focusing function of the Fresnel lens 108, the light emitted from the liquid crystal panel 105 is focused on a right eye 51a and a left eye 51b of a user 50 watching the liquid crystal panel 105. Hence, the second viewing angle can be limited.

After the light emitted from the Fresnel lens 108 is reflected by the reflecting plate 107, the light enters the Fresnel lens 108 again. The light emitted from the Fresnel lens 108 passes through the second light guide plate 104 and the first light guide plate 103, and then enters the switchable diffusing element 106. The light entering the switchable diffusing element 106 passes through the switchable diffusing element 106 without being diffused, and then illuminates the liquid crystal panel 105.

In this way, the liquid crystal panel 10 can function as the privacy display, and a third person other than the user 50 cannot watch the image displayed on the liquid crystal panel 105.

[Advantageous Effect]

As described thus far, when the liquid crystal display device 10 in Embodiment 1 executes 2D displaying at the first viewing angle that is a wide viewing angle, the first light source 101 having a relatively large divergence angle is used. When the liquid crystal display device 10 in Embodiment 1 executes 2D displaying (privacy displaying) at the second viewing angle that is a narrow viewing angle, the second light source 102 having a relatively small divergence angle is used.

When 2D displaying is executed at the second viewing angle, the second light source 102 having the relatively small divergence angle is used. This allows the divergence of the light emitted from the liquid crystal panel 105 to be reduced, thereby increasing the level of privacy of the displayed image.

Moreover, when 2D displaying is executed at the first viewing angle, the first light source 101 having the relatively large divergence angle is used. This allows the divergence of the light emitted from the liquid crystal panel 105 to be increased, thereby reducing power consumption of the first light source

101 required to execute 2D displaying at the wide viewing angle. Furthermore, since the light emitted from the first light source 101 does not pass through, for example, the collimator lens, the light use efficiency of the optical system of the liquid crystal display device 10 can be increased. With this, output of the first light source 101 required to implement a predetermined display luminance on the liquid crystal panel 105 can be reduced, thereby reducing power consumption of the first light source 101.

The following is a more concrete description regarding the advantageous effect achieved in Embodiment 1, i.e., the advantageous effect of reducing power consumption of the first light source 101 when 2D displaying is executed at the first viewing angle that is the wide viewing angle. The necessary light source output (power consumption) of the conventional liquid crystal display device 40 shown in FIG. 13 is compared with that of the liquid crystal display device 10 shown in FIG. 1 in Embodiment 1.

In general, output necessary for a light source (necessary light source output) to implement a predetermined display luminance (a desired amount of display light) can be calculated from a light use efficiency of an optical system and an electrical-optical conversion efficiency of the light source, according to Equation 1 indicating a relational expression below. It should be noted that each of symbols in the parentheses of Equation 1 represents a unit of measure.

Necessary light source output [W]=Desired amount of display light [lm]/(Light use efficiency*Conversion efficiency [lm/W])   Equation 1

When the optical system of the liquid crystal display device 40 shown in FIG. 13 executes 2D displaying at the wide viewing angle, the optical components through which the light emitted from the LED light source 411 passes are the collimator lens 412, the light guide plate 402, the polarized-light reflecting plate 403, the switchable diffusing element 404, and the liquid crystal panel 405. On account of this, the light use efficiency of the optical system executing 2D displaying at the wide viewing angle in the conventional liquid crystal display device 40 shown in FIG. 13 is calculated by multiplying the light use efficiencies of the optical components, as shown by Equation 2 indicating a relational expression below.

Light use efficiency=Light use efficiency of collimator*Light use efficiency of polarized-light reflecting plate*Light use efficiency of light guide plate*Light use efficiency of switchable diffusing element*Light use efficiency of liquid crystal panel   Equation 2

When the optical system of the liquid crystal display device 10 shown in FIG. 1 executes 2D displaying at the wide viewing angle, the optical components through which the light emitted from the first light source 101 passes are the first light guide plate 103, the switchable diffusing element 106, and the liquid crystal panel 105. On account of this, the light use efficiency of the optical system executing 2D displaying at the wide viewing angle in the liquid crystal display device 10 shown in FIG. 1 in Embodiment 1 is calculated by multiplying the light use efficiencies of the optical components, as shown by Equation 3 indicating a relational expression below.

Light use efficiency=Light use efficiency of first light guide plate*Light use efficiency of switchable diffusing element*Light use efficiency of liquid crystal panel   Equation 3

As is obvious from Equation 2 and Equation 3 above, the necessary light source output of the optical system of the liquid crystal display device 10 shown in FIG. 1 to achieve the desired amount of display light is lower because the light use efficiency of the collimator and the light use efficiency of the polarized-light reflecting plate do not need to be considered. For example, suppose that the light use efficiency of the collimator is 40% and that the light use efficiency of the polarized-light reflecting plate is 90%. In such a case, the necessary light source output required for the first light source 101 in FIG. 1 to execute 2D displaying at the wide viewing angle is only 36% of the necessary light source output required for the LED light source 411 in FIG. 13 to execute 2D displaying at the wide viewing angle.

Therefore, it is understood that the liquid crystal display device 10 shown in FIG. 1 in Embodiment 1 is capable of reducing power consumption of the first light source 101 to execute 2D displaying at the wide viewing angle, as compared with the conventional liquid crystal display device 40 in FIG. 13.

[Modification]

A method of switching between 2D displaying at the first viewing angle and 2D displaying at the second viewing angle does not need to be limited to a particular method, and any method may be employed. For example, the liquid crystal display device 10 may include a user interface (UI) that receives input from the user 50, and then the switching between 2D displaying at the first viewing angle and 2D displaying at the second viewing angle may be executed according to the input received by the UI.

Alternatively, a method of using an eye camera that detects each of the positions of the right eye 51a and the left eye 51b of the user 50 may be employed. With this method, when it is determined from a detection signal of the eye camera that at least one of the positions of the right eye 51a and the left eye 51b of the user 50 is outside the second viewing angle, 2D displaying at the second viewing angle is automatically switched to 2D displaying at the first viewing angle. With this, the trouble of having to switch the viewing angle can be reduced for the user. Or, when the eye camera detects two or more users 50, 2D displaying at the second viewing angle may be automatically switched to 2D displaying at the first viewing angle.

In Embodiment 1, the first light source 101 is configured with the white LED light source 111, and the second light source 102 is configured with the RGB LED light source 121 and the collimator lens 122. However, the present invention is not limited to this. Each of the first light source 101 and the second light source 102 is not limited to a particular light source, and may be configured with an LED light source, a cold cathode fluorescent lamp (CCFL), or a laser light source, for example. Moreover, the first light source 101 and the second light source 102 may be configured with different types of light sources or the same type of light source. When the first light source 101 and the second light source 102 are configured with the same type of light source, the second light source 102 includes the collimator lens 122, for example.

For example, the first light source 101 may be configured with an LED light source, and the second light source 102 may be configured with a laser light source and a collimator lens. When the first light source 101 is configured with a white LED light source that has an excellent luminous efficacy, power consumption of the first light source 101 to execute 2D displaying at the first viewing angle can be further reduced. Moreover, when the second light source 102 is configured with the laser light source that has a small divergence angle, the light capture efficiency of the collimator lens 122 can be increased.

In Embodiment 1, the collimator lens 122 is used as an optical element to reduce the second divergence angle. However, this optical element does not need to be limited to a particular optical element, and may be any optical element as long as the optical element has a function of reducing a divergence angle by capturing light emitted from a light source. For example, a plurality of collimator lenses arranged in parallel may be used as the optical element. Or, a lenticular lens, a diffraction element, or a hologram may be used as the optical element, for example.

In Embodiment 1, the Fresnel lens 108 is used in order to limit the second viewing angle. However, in place of the Fresnel lens 108, a prism sheet or a diffraction optical element may be used for example.

Embodiment 2

Figure 5:
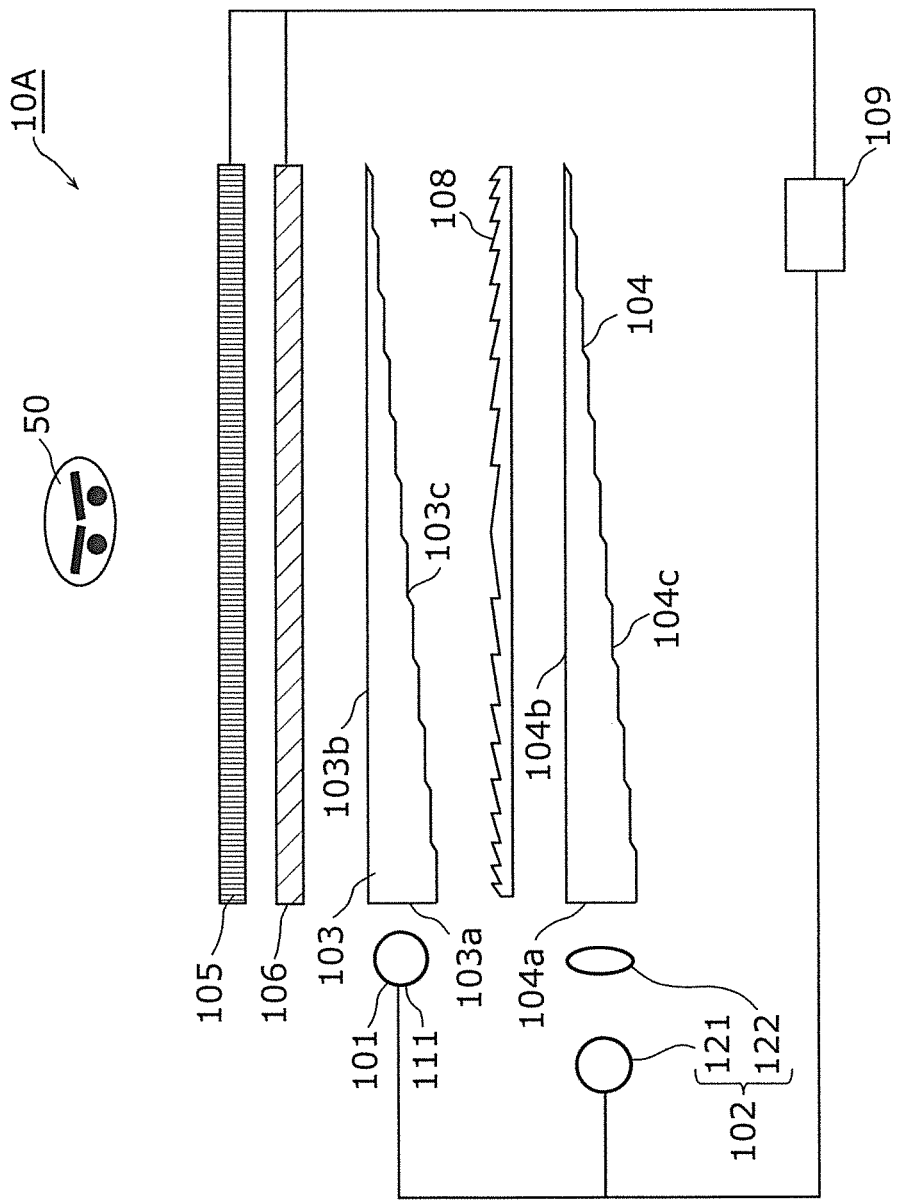
FIG. 5 is a diagram showing a configuration of a liquid crystal display device in Embodiment 2.

FIG. 5 is a diagram showing a configuration of a liquid crystal display device 10A in Embodiment 2. As shown in FIG. 5, a first light guide plate 103 and a second light guide plate 104 are positioned in such a manner that main surfaces 103b and 104b thereof face toward a liquid crystal panel 105 in Embodiment 2. Both a first light source 101 and a second light source 102 are positioned at one side of the liquid crystal display device 10A. A Fresnel lens 108 is positioned between the first light guide plate 103 and the second light guide plate 104.

With the above configuration, the reflecting plate 107 of Embodiment 1 can be omitted. Thus, the number of components of the liquid crystal display device 10A can be reduced.

Embodiment 3

Figure 6:
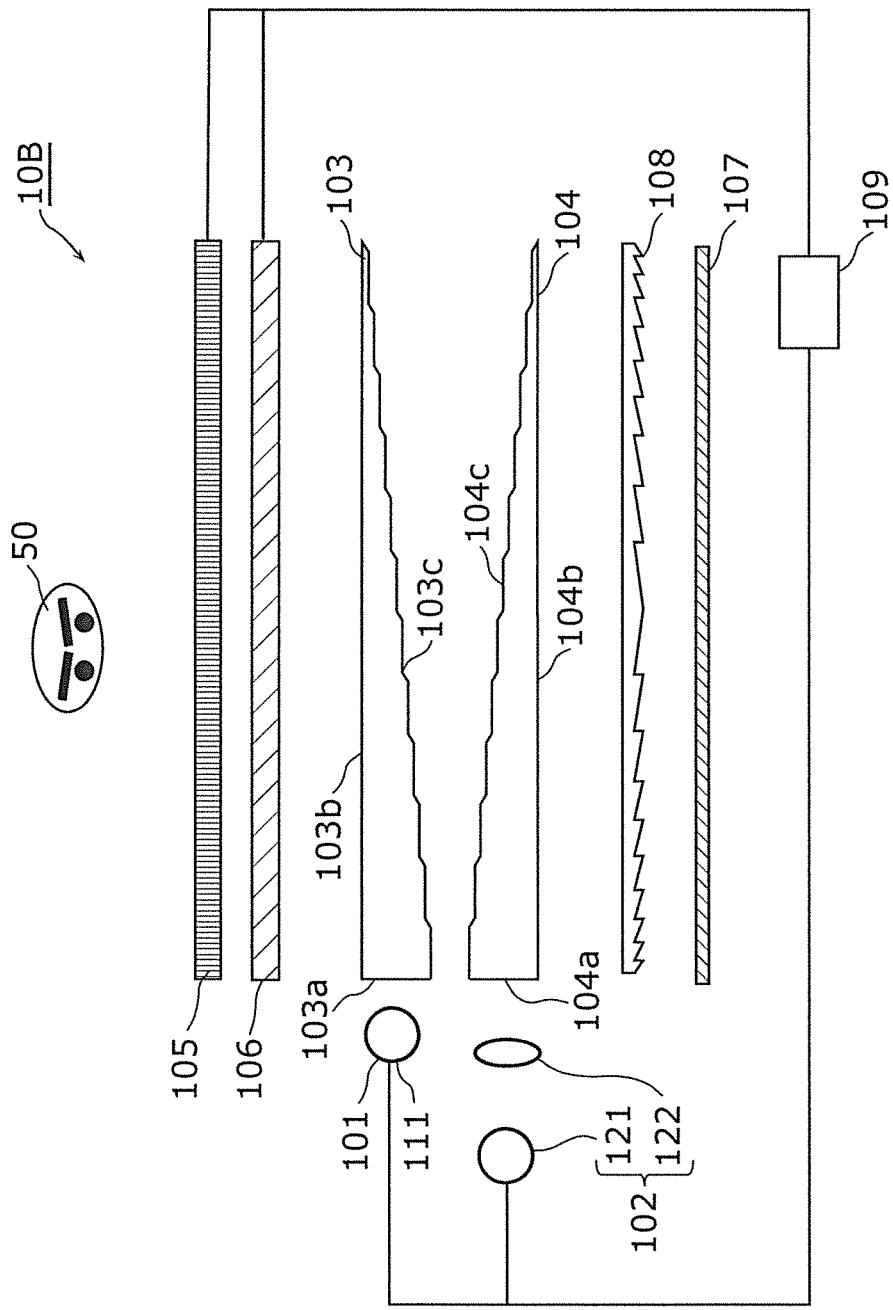
FIG. 6 is a diagram showing a configuration of a liquid crystal display device in Embodiment 3.

FIG. 6 is a diagram showing a configuration of a liquid crystal display device 10B in Embodiment 3. As shown in FIG. 6, a first light guide plate 103 and a second light guide plate 104 are positioned in such a manner that prism units 103c and 104c thereof are opposite to each other in Embodiment 3. Both a first light source 101 and a second light source 102 are positioned at one side of the liquid crystal display device 10B.

With the above configuration, a line, a cooling system, and the like for controlling the first light source 101 and the second light source 102 can be shared in part. Thus, the cost of manufacturing the liquid crystal display device 10B can be reduced.

Embodiment 4

Figure 7:
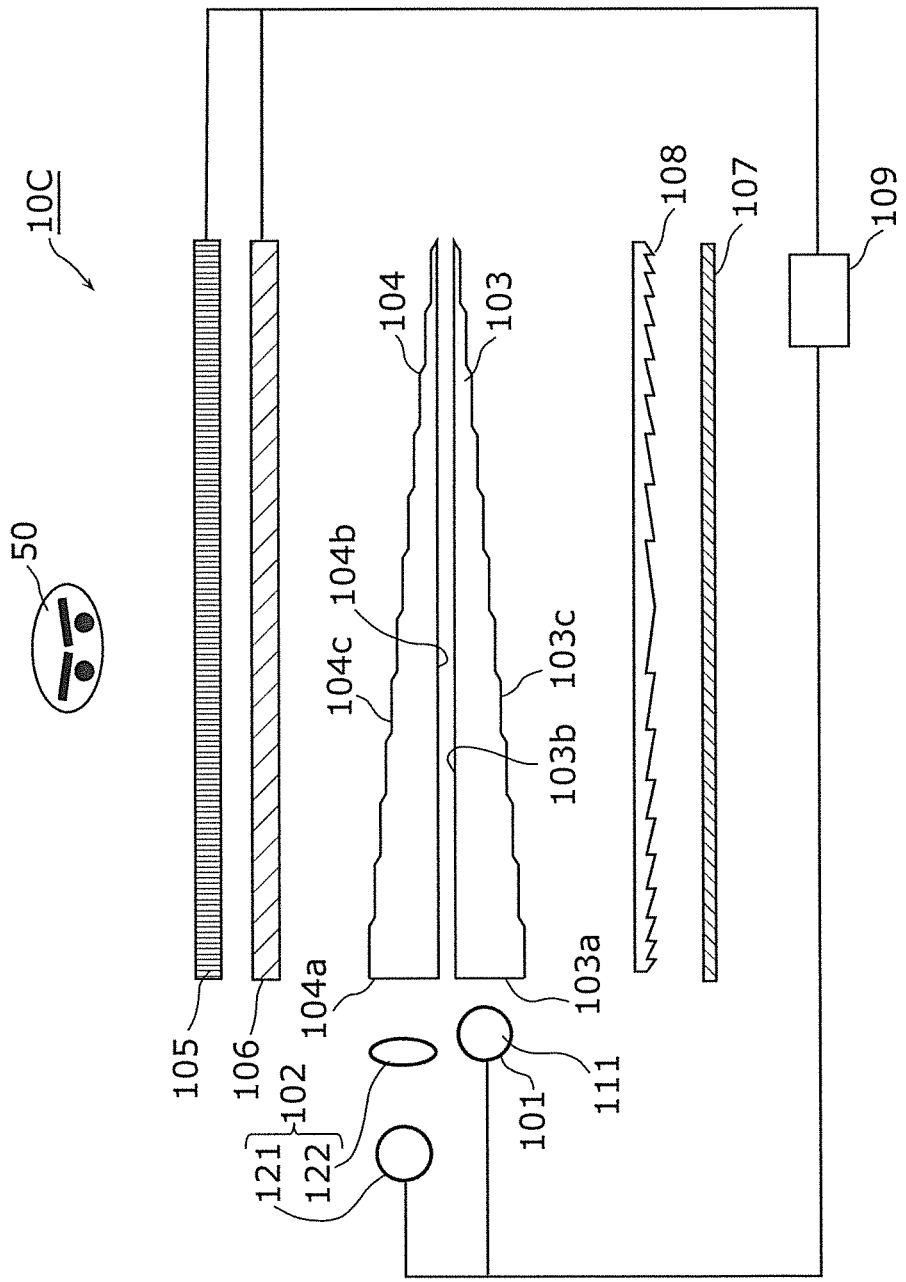
FIG. 7 is a diagram showing a configuration of a liquid crystal display device in Embodiment 4.

FIG. 7 is a diagram showing a configuration of a liquid crystal display device 10C in Embodiment 4. As shown in FIG. 7, a first light guide plate 103 and a second light guide plate 104 are positioned in such a manner that main surfaces 103b and 104b thereof are opposite to each other in Embodiment 4. The second light guide plate 104 is positioned between the first light guide plate 103 and a switchable diffusing element 106. Moreover, both a first light source 101 and a second light source 102 are positioned at one side of the liquid crystal display device 10C.

With the above configuration, the relative positional relationship between the first light guide plate 103 and the second light guide plate 104 can be easily adjusted.

Embodiment 5

Figure 8:
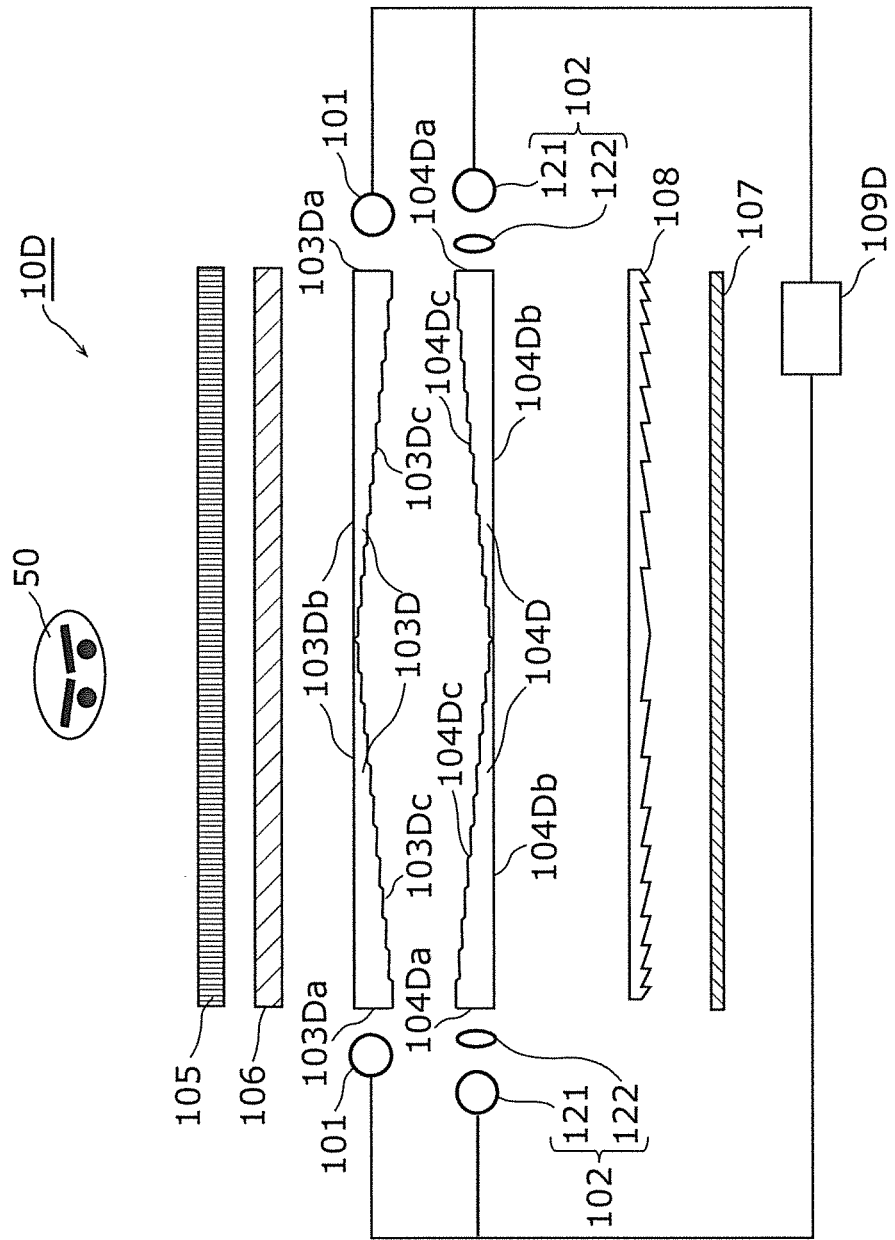
FIG. 8 is a diagram showing a configuration of a liquid crystal display device in Embodiment 5.

FIG. 8 is a diagram showing a configuration of a liquid crystal display device 10D in Embodiment 5. As shown in FIG. 8, two pairs of a first light guide plate 103D and a second light guide plate 104D are provided in Embodiment 5. Moreover, corresponding to these two pairs, two pairs of a first light source 101 and a second light source 102 are provided. The first light guide plate 103D and the second light guide plate 104D of each pair are positioned in such a manner that prism units 103Dc and 104Dc thereof are opposite to each other. One of the two pairs of the first light source 101 and the second light source 102 is positioned at one side of the liquid crystal display device 10D, and the other pair is positioned at the other side of the liquid crystal display device 10D. A control unit 109D causes the pair of the first light sources 101 or the pair of the second light sources 102 to emit light.

With the above configuration, the number of the first light sources 101 and the second light sources 102 to be used can be increased. Thus, necessary light source output required for each of the first light sources 101 of the pair and each of the second light sources 102 of the pair in order to implement a certain display luminance on the liquid crystal panel 105 is reduced. Therefore, control can be easily performed for each of the first light sources 101 of the pair and each of the second light sources 102 of the pair. Moreover, a processing load can be reduced for each of the first light sources 101 of the pair and each of the second light sources 102 of the pair.

Embodiment 6

Configuration of Liquid Crystal Display Device

Figure 9:
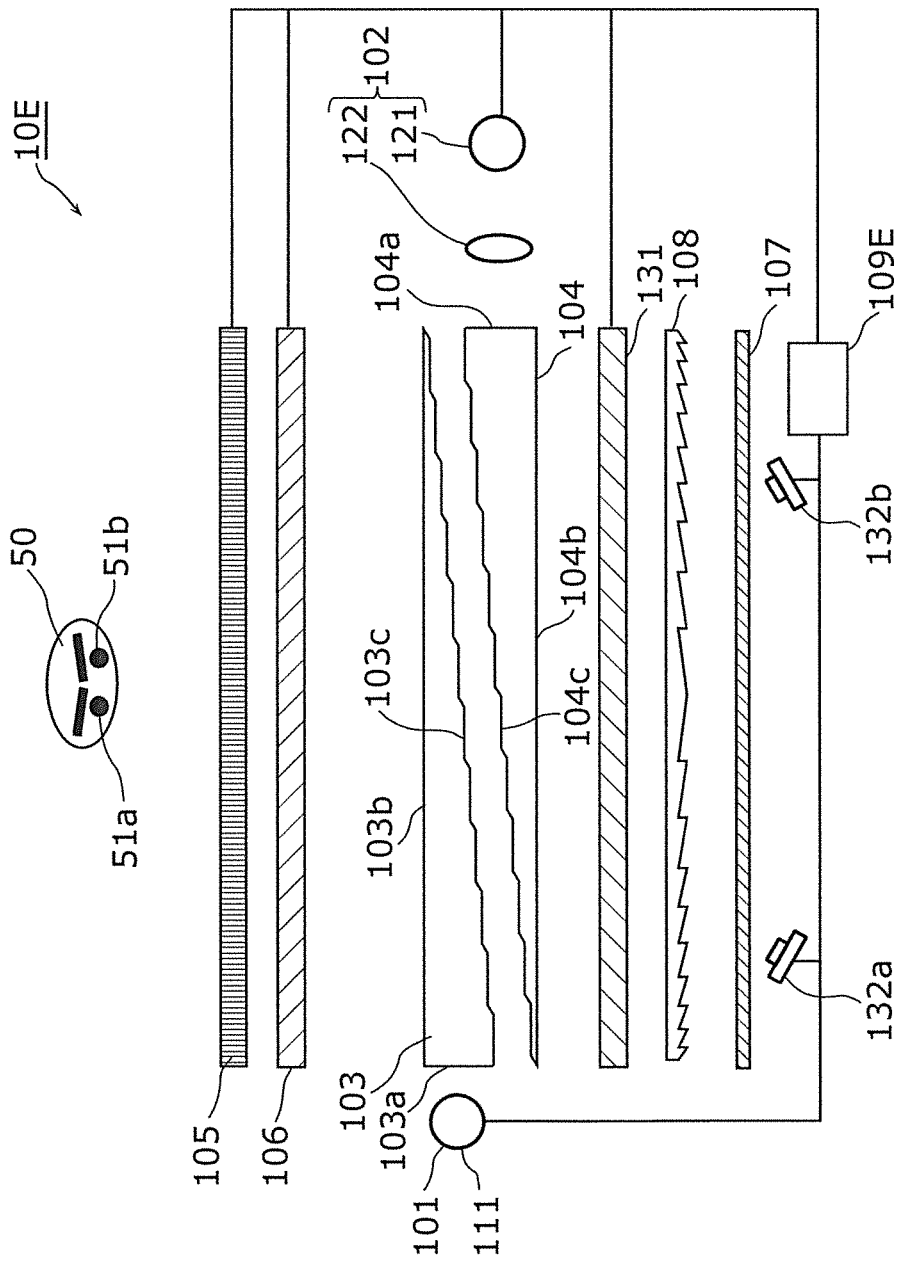
FIG. 9 is a diagram showing a configuration of a liquid crystal display device in Embodiment 6.

FIG. 9 is a diagram showing a configuration of a liquid crystal display device 10E in Embodiment 6. The liquid crystal display device 10E in Embodiment 6 is switchable between 2D displaying and 3D displaying. As shown in FIG. 9, in addition to the structural elements included in the liquid crystal display device 10 in Embodiment 1 described above, the liquid crystal display device 10E in Embodiment 6 includes a light deflector 131 positioned between a second light guide plate 104 and a Fresnel lens 108.

The light deflector 131 has a function of deflecting light incident on an incident end surface of the light deflector 131 and modulating a deflection angle of the light. The light deflector 131 is configured with, for example, a liquid crystal prism array having a modulable refractive index. By adjusting a voltage to be applied to the liquid crystal prism array, the refractive index of the liquid crystal prism array is modulated and, as a result, the light incident on the liquid crystal prism array can be deflected.

Moreover, the liquid crystal display device 10E in Embodiment 6 includes a pair of eye cameras 132a and 132b (configuring a detection unit). The eye cameras 132a and 132b of the pair respectively detect positions of a right eye 51a and a left eye 51b of a user 50 watching a liquid crystal panel 105. Each of detection signals from the pair of the eye cameras 132a and 132b is transmitted to a control unit 109E.

The control unit 109E causes a first light source 101 to emit light when causing the liquid crystal panel 105 to display an image for 2D displaying. The control unit 109E causes a second light source 102 to emit light when causing the liquid crystal panel 105 to display a parallax image for 3D displaying. Moreover, when causing the liquid crystal panel 105 to display the parallax image for 3D displaying, the control unit 109E causes the liquid crystal panel 105 to alternately display a parallax image for the right eye and a parallax image for the left eye. Furthermore, according to the parallax image displayed on the liquid crystal panel 105 for 3D displaying, the control unit 109E controls the light deflector 131 in such a manner that the light from the liquid crystal panel 105 is focused alternately on the right eye 51a and the left eye 51b of the user 50. To be more specific, when the parallax image for the right eye is displayed on the liquid crystal panel 105, the control unit 109E controls the light deflection angle caused by the light deflector 131 in such a manner that the light from the liquid crystal panel 105 is focused on the right eye 51*a* of the user 50. Similarly, when the parallax image for the left eye is displayed on the liquid crystal panel 105, the control unit 109E controls the light deflection angle caused by the light deflector 131 in such a manner that the light from the liquid crystal panel 105 is focused on the left eye 51*b* of the user 50.

Moreover, based on the detection signals from the pair of the eye cameras 132*a* and 132*b*, the control unit 109E controls illumination states of the first light source 101 and the second light source 102 and also switches the switchable diffusing element 106 to a diffusion state or a non-diffusion state. To be more specific, when the positions of the right eye 51*a* and the left eye 51*b* of the user 50 are both in the second viewing angle, the control unit 109E causes the second light source 102 to emit light and switches the switchable diffusing element 106 to the non-diffusion state. When at least one of the positions of the right eye 51*a* and the left eye 51*b* of the user 50 is outside the second viewing angle, the control unit 109E causes the first light source 101 to emit light and switches the switchable diffusing element 106 to the diffusion state.

[Operation of Liquid Crystal Display Device]

Next, an operation performed by the liquid crystal display device 10E in Embodiment 6 is described. When the liquid crystal display device 10E functions as a 2D display, the control unit 109E causes the first light source 101 to emit light and switches the switchable diffusing element 106 to the diffusion state as in Embodiment 1. The operation performed by the liquid crystal display device 10E in this case is the same as described in Embodiment 1 and, therefore, the explanation is omitted here.

When the liquid crystal display device 10E functions as a 3D display, the control unit 109E causes the second light source 102 to emit light and switches the switchable diffusing element 106 to the non-diffusion state. Light emitted from an RGB LED light source 121 is reduced in divergence angle by a collimator lens 122 and, after this, enters a side surface 104*a* of the second light guide plate 104. The light entering the side surface 104*a* of the second light guide plate 104 is transmitted through the second light guide plate 104. Then, the traveling direction of the light is changed by a prism unit 104*c*. After this, the light is emitted from a main surface 104*b* to the direction opposite to the liquid crystal panel 105. The light emitted from the main surface 104*b* of the second light guide plate 104 enters the light deflector 131.

When the parallax image for the right eye is displayed on the liquid crystal panel 105, the light incident on the light deflector 131 is deflected in such a manner that the light from the liquid crystal panel 105 is focused on the right eye 51*a* of the user 50. Similarly, when the parallax image for the left eye is displayed on the liquid crystal panel 105, the light incident on the light deflector 131 is deflected in such a manner that the light from the liquid crystal panel 105 is focused on the left eye 51*b* of the user 50.

The light emitted from the light deflector 131 enters the Fresnel lens 108. After the light emitted from the Fresnel lens 108 is reflected by a reflecting plate 107, the light enters the Fresnel lens 108 and the light deflector 131 again. The light incident on the light deflector 131 is deflected in the same way as described above. The light emitted from the light deflector 131 passes through the second light guide plate 104 and the first light guide plate 103, and then enters the switchable diffusing element 106. The light entering the switchable diffusing element 106 passes through the switchable diffusing element 106 without being diffused, and then illuminates the liquid crystal panel 105.

In this way, the liquid crystal display device 10E can function as the 3D display and execute 3D displaying at the second viewing angle. Moreover, since the second light source 102 having the relatively small divergence angle is used, the divergence of the light from the liquid crystal panel 105 is reduced. This can prevent crosstalk from occurring.

Thus, depending on the cases where 2D displaying is executed at the first viewing angle and where 3D displaying is executed at the second viewing angle, the different light sources such as the first light source and the second light source are used in Embodiment 6. With this, the same advantageous effect as described in Embodiment 1 can be achieved.

When the positions of the right eye 51*a* and the left eye 51*b* of the user 50 are both in the second viewing angle, the control unit 109E causes the second light source 102 to emit light and switches the switchable diffusing element 106 to the non-diffusion state according to the detection signals from the pair of the eye cameras 132*a* and 132*b*. Moreover, the control unit 109E causes the liquid crystal panel 105 to display the parallax image for 3D displaying. Accordingly, the liquid crystal display device 10E functions as the 3D display. In this state, for example, when the head region of the user 50 moves laterally with respect to the liquid crystal panel 105, at least one of the positions of the right eye 51*a* and the left eye 51*b* of the user 50 moves outside the second viewing angle. In such a case, the control unit 109E causes the first light source 101 to emit light and switches the switchable diffusing element 106 to the diffusion state, according to the detection signals from the pair of the eye cameras 132*a* and 132*b*. Moreover, the control unit 109E switches the image to be displayed on the liquid crystal panel 105 from the parallax image for 3D displaying to the image for 2D displaying. As a result, the liquid crystal display device 10E is switched from the 3D display to the 2D display.

As described thus far, switching between 3D displaying and 2D displaying can be performed as appropriate, according to the positions of the right eye 51*a* and the left eye 51*b* of the user 50. On account of this, even when the head region of the user 50 moves laterally with respect to the liquid crystal panel 105, for example, the user 50 can continue to watch the image displayed on the liquid crystal panel 105.

[Modification]

Although the light deflector 131 is configured with the liquid crystal prism array in Embodiment 6, the present invention is not limited to this. For example, the light deflector 131 may be configured with a micro electro mechanical systems (MEMS) mirror. In this case, the light can be deflected at a higher speed. Alternatively, the light deflector 131 may be configured with a variable diffraction element. This variable diffraction element includes a liquid crystal in which an interference pattern is formed, and the interference pattern can be switched ON and OFF by the application of voltage to the liquid crystal.

Moreover, although only one layer of the light deflector 131 is provided in Embodiment 6, a plurality of layers of the light deflectors 131 may be provided. In such a case, since the light is deflected by each of the layers of the light deflectors 131, an overall deflection angle of the light can be increased.

Furthermore, although the light deflector 131 is positioned between the second light guide plate 104 and the Fresnel lens 108 in Embodiment 6, the position of the light deflector 131 is not limited to this. For example, the light deflector 131 may be positioned between the Fresnel lens 108 and the reflecting plate 107. Alternatively, the light deflector 131 may be positioned between the switchable diffusing element 106 and the first light guide plate 103.

When the light deflector 131 has a wavelength dependence, the deflection angle is different for each of the RGB light beams incident on the light deflector 131 according to the wavelengths of the RGB light beams. Thus, in this case, the control unit 109E causes the RGB LED light source 121 to sequentially emit red light, green light, and blue light. Moreover, the control unit 109E also controls the light deflector 131 in such a manner that the red light, the green light, and the blue light sequentially incident on the light deflector 131 have the same deflection angle. With this, so-called color deviation, whereby the focus position is different for each of the right eye 51a and the left eye 51b of the user 50 because of the wavelengths of the RGB light beams, can be prevented from occurring. Here, when the light deflector 131 is configured with a plurality of layers of light deflectors having different wavelength dependences, the deflection functions of the light deflectors having the wavelength dependences corresponding to the wavelengths may be switched between ON and OFF, according to respective times when the red light, the green light, and the blue light are to be emitted.

When the light deflector 131 has a wavelength dependence as described above, a white LED light source 111 may be used as the first light source 101 and the RGB LED light source 121 may be used as the second light source 102, for example. In general, the white LED light source 111 has a higher electrical-optical conversion efficiency than the RGB LED light source 121, and can emit bright light with less power consumption. When 2D displaying is executed using the white LED light source 111 having the high electrical-optical conversion efficiency, the necessary light source output required for the first light source 101 can be reduced, as can be understood from Equation 1 above. For example, suppose that the electrical-optical conversion efficiency of the white LED light source 111 is 70 (lm/W) and that the electrical-optical conversion efficiency of the RGB LED light source 121 is 50 (lm/W). In this case, the necessary light source output required to execute 2D displaying using the white LED light source 111 is only about 70 percent of the necessary light source output required to execute 2D displaying using the RGB LED light source 121. Therefore, by using the white LED light source 111 as the first light source 101, the necessary light source output required to execute 2D displaying at the first viewing angle can be reduced, thereby saving electric power.

A method of switching between 3D displaying and 2D displaying does not need to be limited to a particular method, and any method may be employed. For example, the liquid crystal display device 10E may include a UI that receives input from the user 50, and then the switching between 3D displaying and 2D displaying may be executed according to the input received by the UI. Alternatively, when the pair of the eye cameras 132a and 132b detects two or more users 50, 3D displaying may be automatically switched to 2D displaying. Or, the switching between 3D displaying and 2D displaying may be automatically executed according the details of content to be displayed on the liquid crystal panel 105.

Embodiment 7

Configuration of Liquid Crystal Display Device

Figure 10:
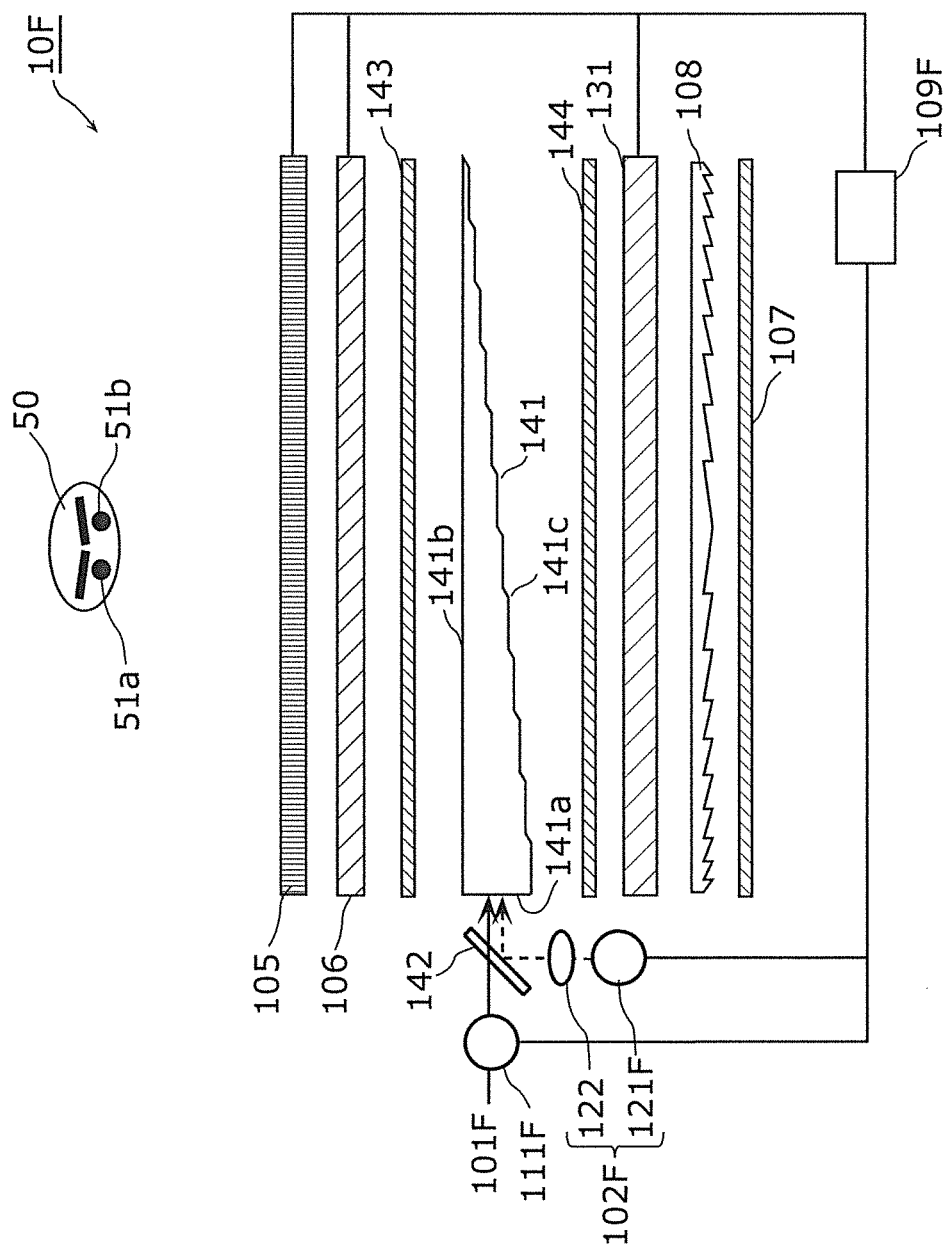
FIG. 10 is a diagram showing a configuration of a liquid crystal display device in Embodiment 7.
Figure 11:
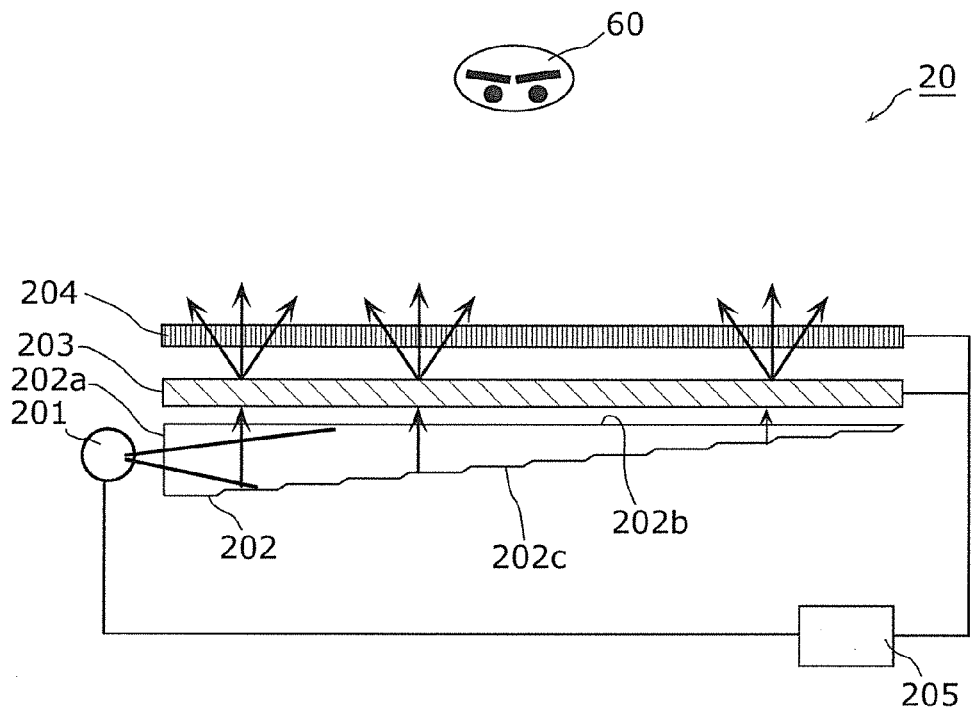
FIG. 11 is a diagram showing a configuration of a conventional liquid crystal display device capable of 2D displaying.
Figure 12:
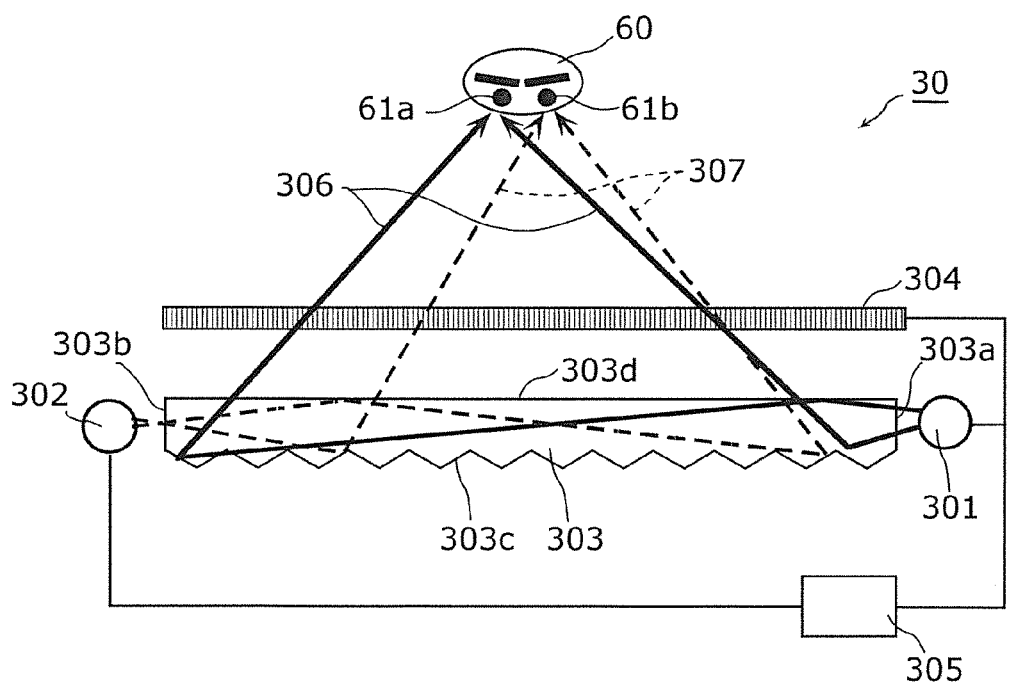
FIG. 12 is a diagram showing a configuration of a conventional liquid crystal display device capable of 3D displaying.

FIG. 10 is a diagram showing a configuration of a liquid crystal display device 10F in Embodiment 7. As shown in FIG. 10, the liquid crystal display device 10F in Embodiment 7 includes only one light guide plate 141. This light guide plate 141 is configured in the same manner as the first light guide plate 103 in Embodiment 1 described above.

A first light source 101F and a second light source 102F are provided at the side of a side surface 141a of the light guide plate 141. A white LED light source 111F of the first light source 101F emits P-polarized light that is linearly polarized light polarized in the direction parallel to the plane where the present diagram is illustrated. An RGB LED light source 121F of the second light source 102F emits S-polarized light that is linearly polarized light polarized in the direction perpendicular to the plane where the present diagram is illustrated.

A polarization beam splitter 142 is positioned between the first light source 101F and the side surface 141a of the light guide plate 141. The polarization beam splitter 142 has a function of allowing the P-polarized light to pass through and reflecting the S-polarized light.

Moreover, in addition to the structural elements included in the liquid crystal display device 10E in Embodiment 6 described above, the liquid crystal display device 10F in Embodiment 7 includes a polarized-light reflecting plate 143 and a quarter wavelength plate 144.

The polarized-light reflecting plate 143 is positioned between the light guide plate 141 and a switchable diffusing element 106. The polarized-light reflecting plate 143 has a function of allowing the P-polarized light to pass through and reflecting the S-polarized light. The polarized-light reflecting plate 143 is configured with, for example, a wire grid.

The quarter wavelength plate 144 is positioned between the light guide plate 141 and a light deflector 131. The quarter wavelength plate 144 is a retardation film having a function of transforming linearly-polarized light having a certain wavelength into circular polarized light (or transforming circular polarized light into linearly polarized light). A quarter phase difference (i.e., a phase difference of 90° angle) of a wavelength λ occurs between the linearly polarized light incident on the quarter wavelength plate 144 and the linearly polarized light emitted after passing through the quarter wavelength plate 144 twice.

[Operation of Liquid Crystal Display Device]

Next, an operation performed by the liquid crystal display device 10F in Embodiment 7 is described. When the liquid crystal display device 10F functions as a 2D display, a control unit 109F causes the first light source 101 to emit light and switches the switchable diffusing element 106 to the diffusion state as in Embodiment 6 described above. The P-polarized light emitted from the first light source 101F passes through the polarization beam splitter 142 and enters the side surface 141a of the light guide plate 141. The light entering the side surface 141a of the light guide plate 141 is transmitted through the light guide plate 141. Then, the traveling direction of the light is changed by a prism unit 141c. After this, the light is emitted from a main surface 141b toward a liquid crystal panel 105. The light emitted from the main surface 141b of the light guide plate 141 enters the polarized-light reflecting plate 143.

Here, since the light emitted from the first light source 101F is the P-polarized light, the light emitted from the main surface 141b of the light guide plate 141 passes through the polarized-light reflecting plate 143 and enters the switchable diffusing element 106. The switchable diffusing element 106 has been switched to the diffusion state. Thus, the light from the polarized-light reflecting plate 143 is diffused by the switchable diffusing element 106, and then illuminates the liquid crystal panel 105. In this way, the liquid crystal display device 10F can provide a user 50 with 2D displaying at the first viewing angle.

When the liquid crystal display device 10F functions as a 3D display, the control unit 109F causes the second light source 102 to emit light and switches the switchable diffusing element 106 to the non-diffusion state as in Embodiment 6 described above. The S-polarized light emitted from the RGB LED light source 121 of the second light source 102F is reflected by the polarization beam splitter 142 and enters the side surface 141a of the light guide plate 141. As is the case described above, the light entering the side surface 141a of the light guide plate 141 is transmitted through the light guide plate 141. Then, the traveling direction of the light is changed by a prism unit 141c. After this, the light is emitted from the main surface 141b toward the liquid crystal panel 105. The light emitted from the main surface 141b of the light guide plate 141 enters the polarized-light reflecting plate 143.

Here, since the light emitted from the second light source 102F is the S-polarized light, the light emitted from the main surface 141b of the light guide plate 141 is reflected by the polarized-light reflecting plate 143. The light reflected by the polarized-light reflecting plate 143 passes through the light guide plate 141, and next passes through the quarter wavelength plate 144. The light passing through the quarter wavelength plate 144 is deflected by the light deflector 131, and is then focused by a Fresnel lens 108. The light emitted from the Fresnel lens 108 is reflected by the reflecting plate 107 and focused by the Fresnel lens 108 again. The light emitted from the Fresnel lens 108 is deflected by the light deflector 131 again. After this, by passing through the quarter wavelength plate 144, the light is transformed from the S-polarized light into the P-polarized light. This P-polarized light passes through the light guide plate 141 and the polarized-light reflecting plate 143, and then enters the switchable diffusing element 106. Here, the switchable diffusing element 106 has been switched to the non-diffusion state. Thus, the light from the polarized-light reflecting plate 143 passes through the switchable diffusing element 106 without being diffused, and then illuminates the liquid crystal panel 105. In this way, the liquid crystal display device 10F can provide the user 50 with 3D displaying at the second viewing angle.

Although the present invention in an aspect or aspects has been described by way of Embodiments above, it should be obvious that the present invention is not limited to Embodiments described above. Other embodiments implemented through various changes and modifications, conceived by those skilled in the art, made to Embodiments described above or through a combination of the structural elements in different Embodiments described above may be included in the scope in an aspect or aspects according to the present invention, unless such changes, modifications, and combination depart from the scope of the present invention.

INDUSTRIAL APPLICABILITY

The display device according to the present invention is applicable as, for example, a liquid crystal display device that has a switchable viewing angle for displaying an image.

REFERENCE SIGNS LIST 10, 10A, 10B, 10C, 10D, 10E, 10F, 20, 30, 40 Liquid crystal display device
50, 60 User
51a, 61a Right eye
51b, 61b Left eye
101, 101F First light source
102, 102F Second light source
103, 103D First light guide plate
103a, 103Da, 104a, 104Da, 141a, 202a, 303a, 303b, 402a Side surface
103b, 103Db, 104b, 104Db, 141b, 202b, 303d, 402b Main surface
103c, 103Dc, 104c, 104Dc, 141c, 202c, 303c, 402c Prism unit
104, 104D Second light guide plate
105, 204, 304, 405 Liquid crystal panel
106, 404 Switchable diffusing element
107, 409 Reflecting plate
108, 408 Fresnel lens
109, 109D, 109E, 109F, 205, 305, 410 Control unit
111, 111F White LED light source
121, 121F RGB LED light source
121' Virtual light source
122, 412 Collimator lens
131, 407 Light deflector
132a, 132b Eye camera
141, 202, 303, 402 Light guide plate
142 Polarization beam splitter
143, 403 Polarized-light reflecting plate
144, 406 Quarter wavelength plate
201, 301, 302, 401 Light source
203 Diffuser plate
411 LED light source

The invention claimed is:

1. A display device which has a switchable viewing angle for displaying an image, the display device comprising:
    a first light source which emits light;
    a second light source which emits light;
    a display panel which displays the image;
    a light guide plate which guides each of the light from the first light source and the light from the second light source to the display panel; and
    a control unit configured to cause one of the first light source and the second light source to emit the light,
    a switchable diffusing element which is switchable between a diffusion state where light from the light guide plate is diffused and a non-diffusion state where the light from the light guide plate is allowed to pass through the switchable diffusing element without being diffused; and
    a light deflector which is capable of deflecting the light from the light guide plate,
    wherein a first divergence angle obtained when the light from the first light source enters the light guide plate is larger than a second divergence angle obtained when the light from the second light source enters the light guide plate, and
    the control unit is configured to:
    switch the switchable diffusing element to the diffusion state when the first light source emits the light;
    switch the switchable diffusing element to the non-diffusion state when the second light source emits the light
    cause the first light source to emit the light when an image for 2D displaying is to be displayed on the display panel; and
    cause the second light source to emit the light, and control the light deflector in such a manner that light from the display panel is focused alternately on a right eye and a left eye of a user, when a parallax image for 3D displaying is to be displayed on the display panel.

2. The display device according to claim 1, further comprising a detection unit configured to detect each of positions of the right eye and the left eye of the user, wherein, when the viewing angle obtained in a case where the first light source emits the light is a first viewing angle and the viewing angle obtained in a case where the second light source emits the light is a second viewing angle smaller than the first viewing angle, the control unit is configured to:

cause the second light source to emit the light when each of the positions of the right eye and the left eye detected by the detection unit is in the second viewing angle; and cause the first light source to emit the light when at least one of the positions of the right eye and the left eye detected by the detection unit is outside the second viewing angle.

3. The display device according to claim 1, wherein the first light source is a white light source, and the second light source includes a red-green-blue (RGB) light source having a red light source, a green light source, and a blue light source.

4. The display device according to claim 3, wherein the light deflector has a wavelength dependence, and the control unit is configured to:

cause the second light source to sequentially emit red light, green light, and blue light; and control the light deflector in such a manner that the red light, the green light, and the blue light sequentially incident on the light deflector have a same deflection angle.

5. The display device according to claim 3, wherein the first light source is a white light-emitting diode (LED) light source, and the second light source includes:

an RGB LED light source having a red LED light source, a green LED light source, and a blue LED light source; and an optical element that is positioned on an optical path between the RGB LED light source and the light guide plate and reduces the second divergence angle.

6. A display device which has a switchable viewing angle for displaying an image, the display device comprising:

a first light source which emits light;

a second light source which emits light;

a display panel which displays the image;

a light guide plate which guides each of the light from the first light source and the light from the second light source to the display panel; and a control unit configured to cause one of the first light source and the second light source to emit the light, wherein a first divergence angle obtained when the light from the first light source enters the light guide plate is larger than a second divergence angle obtained when the light from the second light source enters the light guide plate, the first light source is an LED light source, and the second light source includes:

a laser light source; and an optical element that is positioned on an optical path between the laser light source and the light guide plate and reduces the second divergence angle.

7. A display device which has a switchable viewing angle for displaying an image, the display device comprising:

a first light source which emits light;

a second light source which emits light;

a display panel which displays the image;

a light guide plate which guides each of the light from the first light source and the light from the second light source to the display panel; and a control unit configured to cause one of the first light source and the second light source to emit the light, wherein the light guide plate includes:

a first light guide plate which guides the light emitted from the first light source to the display panel; and a second light guide plate which guides the light emitted from the second light source to the display panel, wherein each of the first light guide plate and the second light guide plate includes a prism unit configured to change a traveling direction of light incident on the prism unit, the first light guide plate and the second light guide plate are arranged in such a manner that the prism units are opposite to each other, and the first divergence angle obtained when the light from the first light source enters the first light guide plate is larger than the second divergence angle obtained when the light from the second light source enters the second light guide plate.

8. The display device according to claim 7, further comprising a reflecting plate which reflects the light from the second light guide plate, wherein the light from the first light guide plate is emitted to the display panel, and the light from the second light guide plate is emitted in a direction opposite to the display panel, and is reflected by the reflecting plate to enter the display panel.

9. The display device according to claim 8, further comprising a Fresnel lens which is positioned between the second light guide plate and the reflecting plate and limits the viewing angle to be obtained when the second light source emits the light.

* * * * *